US009571846B2

(12) United States Patent
Millet et al.

(10) Patent No.: US 9,571,846 B2
(45) Date of Patent: Feb. 14, 2017

(54) DATA STORAGE AND ACCESS IN BLOCK PROCESSING PIPELINES

(71) Applicant: Apple Inc., Cupertino, CA (US)

(72) Inventors: Timothy John Millet, Mountain View, CA (US); Mark P. Rygh, Union City, CA (US); Craig M. Okruhlica, San Jose, CA (US); Jim C. Chou, San Jose, CA (US); Guy Cote, San Jose, CA (US); Gaurav S. Gulati, Pleasanton, CA (US); Joseph J. Cheng, Palo Alto, CA (US); Joseph P. Bratt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 498 days.

(21) Appl. No.: 14/039,764

(22) Filed: Sep. 27, 2013

(65) Prior Publication Data

US 2015/0092843 A1 Apr. 2, 2015

(51) Int. Cl.
*H04N 19/423* (2014.01)
*H04N 19/56* (2014.01)
*H04N 19/53* (2014.01)

(52) U.S. Cl.
CPC ............ *H04N 19/423* (2014.11); *H04N 19/53* (2014.11)

(58) Field of Classification Search
CPC ...... G06F 9/3867; G06F 12/00; H04N 19/423; H04N 19/00678; H04N 19/00303; H04N 19/00315
See application file for complete search history.

(56) References Cited

U.S. PATENT DOCUMENTS

| 6,005,624 | A | 12/1999 | Vainsencher |
| 7,725,745 | B2 | 5/2010 | Gabor et al. |
| 7,768,520 | B2 | 8/2010 | Deb |
| 7,822,116 | B2 | 10/2010 | Hinds |
| 7,929,599 | B2 | 4/2011 | Ganesh et al. |
| 8,068,545 | B2 | 11/2011 | Penna et al. |

(Continued)

FOREIGN PATENT DOCUMENTS

WO 2013107906 7/2013

OTHER PUBLICATIONS

U.S. Appl. No. 14/039,820, filed Sep. 27, 2013, Guy Cote, et al.
(Continued)

*Primary Examiner* — Obafemi Sosanya
(74) *Attorney, Agent, or Firm* — Robert C. Kowert; Meyertons, Hood, Kivlin, Kowert & Goetzel, P.C.

(57) ABSTRACT

Block processing pipeline methods and apparatus in which reference data are stored to a memory according to tile formats to reduce memory accesses when fetching the data from the memory. When the pipeline stores reference data from a current frame being processed to memory as a reference frame, the reference samples are stored in macroblock sequential order. Each macroblock sample set is stored as a tile. Reference data may be stored in tile formats for luma and chroma. Chroma reference data may be stored in tile formats for chroma 4:2:0, 4:2:2, and/or 4:4:4 formats. A stage of the pipeline may write luma and chroma reference data for macroblocks to memory according to one or more of the macroblock tile formats in a modified knight's order. The stage may delay writing the reference data from the macroblocks until the macroblocks have been fully processed by the pipeline.

20 Claims, 32 Drawing Sheets

(56) References Cited

U.S. PATENT DOCUMENTS

| | | |
|---|---|---|
| 8,213,511 B2 | 7/2012 | Swami et al. |
| 8,284,844 B2 | 10/2012 | Macinnis et al. |
| 8,320,448 B2 | 11/2012 | Zhao et al. |
| 8,379,718 B2 | 2/2013 | Wang et al. |
| 8,488,673 B2 | 7/2013 | Dencher |
| 8,532,383 B1 | 9/2013 | Thakkar et al. |
| 2004/0042669 A1 | 3/2004 | Jeon et al. |
| 2005/0169371 A1 | 8/2005 | Lee et al. |
| 2006/0045186 A1* | 3/2006 | Koto ............... H04N 19/56 375/240.16 |
| 2010/0053304 A1 | 3/2010 | Underkoffler et al. |
| 2010/0142623 A1 | 6/2010 | Vaduganathan et al. |
| 2012/0014439 A1 | 1/2012 | Segall et al. |
| 2012/0076207 A1 | 3/2012 | Schmit et al. |
| 2012/0099657 A1 | 4/2012 | Tanaka et al. |
| 2012/0140822 A1 | 6/2012 | Wang et al. |
| 2012/0287995 A1 | 11/2012 | Budagavi |
| 2013/0003837 A1 | 1/2013 | Yu et al. |
| 2013/0135351 A1* | 5/2013 | Tripathi ............ G06T 3/606 345/649 |
| 2013/0182774 A1 | 7/2013 | Wang et al. |
| 2013/0188702 A1 | 7/2013 | Li et al. |
| 2014/0169480 A1* | 6/2014 | Lachine ............ G06T 9/00 375/240.23 |

OTHER PUBLICATIONS

U.S. Appl. No. 14/037,316, filed Sep. 25, 2013, Craig M. Okruhlica, et al.
U.S. Appl. No. 14/037,313, filed Sep. 25, 2013, Joseph J. Cheng, et al.
U.S. Appl. No. 14/039,729, filed Sep. 27, 2013, James E. Orr et al.
U.S. Appl. No. 14/037,310, filed Sep. 25, 2013, Guy Cote, et al.
ITU-T H2.64 "Series H: Audiovisual and Multimedia Systems Infrastructure of Audiovisual Services—Coding of Moving Video—Advanced video coding for generic audiovisual services" Apr. 2013 pp. 1-732.

* cited by examiner

|  | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | colspan Cb1[7:0] ||||||||colspan Cb0[7:0] ||||||||
| 1 | Cb3[7:0] ||||||||Cb2[7:0] ||||||||
| 2 | Cb5[7:0] ||||||||Cb4[7:0] ||||||||
| 3 | Cb7[7:0] ||||||||Cb6[7:0] ||||||||
| 4 | Cb9[7:0] ||||||||Cb8[7:0] ||||||||
| 5 | Cb11[7:0] ||||||||Cb10[7:0] ||||||||
| 6 | Cb13[7:0] ||||||||Cb12[7:0] ||||||||
| 7 | Cb15[7:0] ||||||||Cb14[7:0] ||||||||
| 8 | Cb1[15:8] ||||||||Cb0[15:8] ||||||||
| 9 | Cb3[15:8] ||||||||Cb2[15:8] ||||||||
| 10 | Cb5[15:8] ||||||||Cb4[15:8] ||||||||
| 11 | Cb7[15:8] ||||||||Cb6[15:8] ||||||||
| 12 | Cb9[15:8] ||||||||Cb8[15:8] ||||||||
| 13 | Cb11[15:8] ||||||||Cb10[15:8] ||||||||
| 14 | Cb13[15:8] ||||||||Cb12[15:8] ||||||||
| 15 | Cb15[15:8] ||||||||Cb14[15:8] ||||||||
| 16 | Cr1[7:0] ||||||||Cr0[7:0] ||||||||
| 17 | Cr3[7:0] ||||||||Cr2[7:0] ||||||||
| 18 | Cr5[7:0] ||||||||Cr4[7:0] ||||||||
| 19 | Cr7[7:0] ||||||||Cr6[7:0] ||||||||
| 20 | Cr9[7:0] ||||||||Cr8[7:0] ||||||||
| 21 | Cr11[7:0] ||||||||Cr10[7:0] ||||||||
| 22 | Cr13[7:0] ||||||||Cr12[7:0] ||||||||
| 23 | Cr15[7:0] ||||||||Cr14[7:0] ||||||||
| 24 | Cr1[15:8] ||||||||Cr0[15:8] ||||||||
| 25 | Cr3[15:8] ||||||||Cr2[15:8] ||||||||
| 26 | Cr5[15:8] ||||||||Cr4[15:8] ||||||||
| 27 | Cr7[15:8] ||||||||Cr6[15:8] ||||||||
| 28 | Cr9[15:8] ||||||||Cr8[15:8] ||||||||
| 29 | Cr11[15:8] ||||||||Cr10[15:8] ||||||||
| 30 | Cr13[15:8] ||||||||Cr12[15:8] ||||||||
| 31 | Cr15[15:8] ||||||||Cr14[15:8] ||||||||

Width: 16 byte/128 bit. Rows 0–15 span 256 bytes.

*FIG. 20*

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | Cb1[7:0] | | | | | | | | Cb0[7:0] | | | | | | | |
| 1 | Cb3[7:0] | | | | | | | | Cb2[7:0] | | | | | | | |
| 2 | Cb5[7:0] | | | | | | | | Cb4[7:0] | | | | | | | |
| 3 | Cb7[7:0] | | | | | | | | Cb6[7:0] | | | | | | | |
| 4 | Cb9[7:0] | | | | | | | | Cb8[7:0] | | | | | | | |
| 5 | Cb11[7:0] | | | | | | | | Cb10[7:0] | | | | | | | |
| 6 | Cb13[7:0] | | | | | | | | Cb12[7:0] | | | | | | | |
| 7 | Cb15[7:0] | | | | | | | | Cb14[7:0] | | | | | | | |
| 8 | Reserved | | | | | | | | | | | | | | | |
| 9 | Reserved | | | | | | | | | | | | | | | |
| 10 | Reserved | | | | | | | | | | | | | | | |
| 11 | Reserved | | | | | | | | | | | | | | | |
| 12 | Reserved | | | | | | | | | | | | | | | |
| 13 | Reserved | | | | | | | | | | | | | | | |
| 14 | Reserved | | | | | | | | | | | | | | | |
| 15 | Reserved | | | | | | | | | | | | | | | |
| 16 | Cr1[7:0] | | | | | | | | Cr0[7:0] | | | | | | | |
| 17 | Cr3[7:0] | | | | | | | | Cr2[7:0] | | | | | | | |
| 18 | Cr5[7:0] | | | | | | | | Cr4[7:0] | | | | | | | |
| 19 | Cr7[7:0] | | | | | | | | Cr6[7:0] | | | | | | | |
| 20 | Cr9[7:0] | | | | | | | | Cr8[7:0] | | | | | | | |
| 21 | Cr11[7:0] | | | | | | | | Cr10[7:0] | | | | | | | |
| 22 | Cr13[7:0] | | | | | | | | Cr12[7:0] | | | | | | | |
| 23 | Cr15[7:0] | | | | | | | | Cr14[7:0] | | | | | | | |
| 24 | Reserved | | | | | | | | | | | | | | | |
| 25 | Reserved | | | | | | | | | | | | | | | |
| 26 | Reserved | | | | | | | | | | | | | | | |
| 27 | Reserved | | | | | | | | | | | | | | | |
| 28 | Reserved | | | | | | | | | | | | | | | |
| 29 | Reserved | | | | | | | | | | | | | | | |
| 30 | Reserved | | | | | | | | | | | | | | | |
| 31 | Reserved | | | | | | | | | | | | | | | |

16 byte/128 bit width

Rows 0–15: 256 bytes

*FIG. 21*

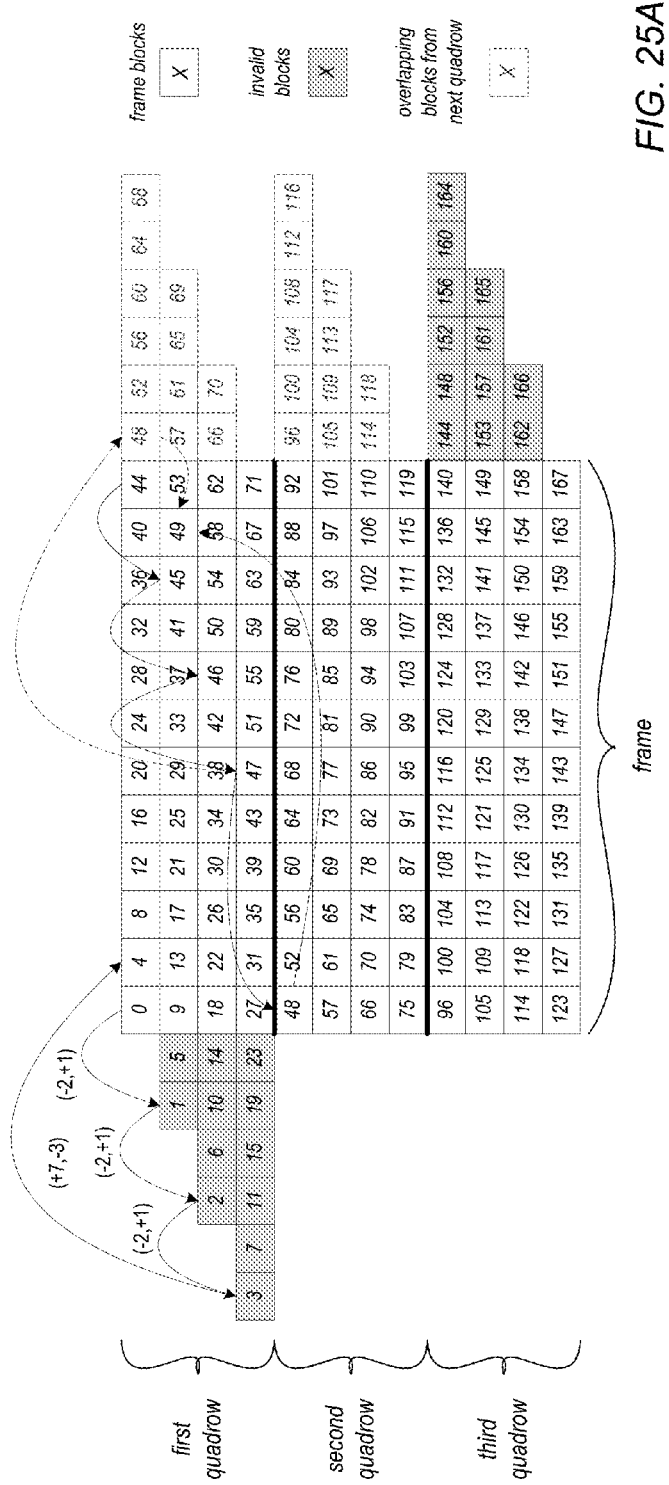
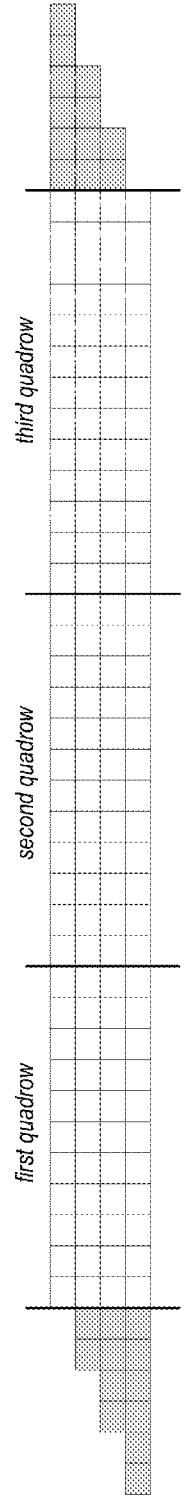
FIG. 25A
FIG. 25B

DATA STORAGE AND ACCESS IN BLOCK PROCESSING PIPELINES

BACKGROUND

Technical Field

This disclosure relates generally to video or image processing, and more specifically to methods and apparatus for processing digital video frames in block processing pipelines.

Description of the Related Art

Various devices including but not limited to personal computer systems, desktop computer systems, laptop and notebook computers, tablet or pad devices, digital cameras, digital video recorders, and mobile phones or smart phones may include software and/or hardware that my implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of block processing methods and apparatus are described in which reference data from macroblocks that have been processed by a block processing pipeline are stored to a memory according to one or more tile formats that may reduce or minimize memory accesses needed to fetch the reference data from the memory system when compared to storing the reference data in scan order. When the block processing pipeline stores reference data from a current frame being processed to memory as a reference frame, instead of writing the reference samples from the processed macroblocks to memory in sequential order across the frame, the reference samples are stored to memory in macroblock sequential order. Each macroblock sample set is stored as a tile. In at least some embodiments, reference data may be stored separately in tile formats for luma and chroma samples. In at least some embodiments, chroma reference data may be stored in tile formats for one or more of chroma 4:2:0, 4:2:2 or 4:4:4 formats.

In at least some embodiments, the block processing pipeline may process blocks of pixels from an input frame according to groups of rows (e.g., in row groups each containing four rows of blocks). In at least some embodiments, the block processing pipeline may process blocks according to a knight's order. A stage at or near the end of the block processing pipeline may write luma and chroma reference data to a memory according to one or more of the macroblock tile formats. In at least some embodiments, the stage may write reference data for macroblocks to the memory according to a modified knight's order. Some pipeline operations performed on a current macroblock at a stage may access and possibly modify pixel data in neighbor macroblocks when processing the current macroblock. Thus, in at least some embodiments, the stage delays writing the reference data from the macroblocks until the reference data for the macroblocks has been fully processed at the stage.

In at least some embodiment, the luma and chroma reference data from a row group is written to the memory via direct memory access (DMA), with a separate DMA channel for each of luma and chroma. In at least some embodiments, the luma and chroma reference data for a row group is written to a memory according to a set of DMA subchannels (e.g. eight subchannels), with two subchannels for each row, the first of which writes the top 12 pixel lines of a macroblock and the second of which writes the bottom 4 pixel lines of a macroblock. For example, the first 12 lines of pixels of the macroblocks on row 0 may be written via subchannel 0, and the last 4 lines of pixels of the macroblocks on row 0 may be written via subchannel 1.

In at least some embodiments, the block processing pipeline may access input video frame data according to a linear memory addressing format based on a block request size of the memory system, for example 64 bytes. In at least some embodiments, a first stage of the pipeline may be a macroblock input stage that reads macroblocks from an input frame according to the linear format, buffers the macroblocks, and writes the macroblock data to a next stage of the pipeline according to an input order (e.g., a knight's order) to begin the pipeline processing of the macroblocks. In at least some embodiments, macroblock data from an input video frame may be passed from one stage of the pipeline to the next stage according to pipeline buffer formats that support different chroma formats (e.g., chroma 4:2:0, 4:2:2 and 4:4:4 formats) efficiently, as well as luma data.

BRIEF DESCRIPTION OF THE DRAWINGS

FIGS. 20 through 22 graphically illustrate data formats for chroma 4:4:4, 4:2:2, and 4:2:0, respectively, that may be used in the stage buffer memory, according to at least some embodiments.

FIGS. 25A and 25B graphically illustrate the knight's order processing method including the algorithm for determining a next block, according to at least some embodiments.

Figure 1:
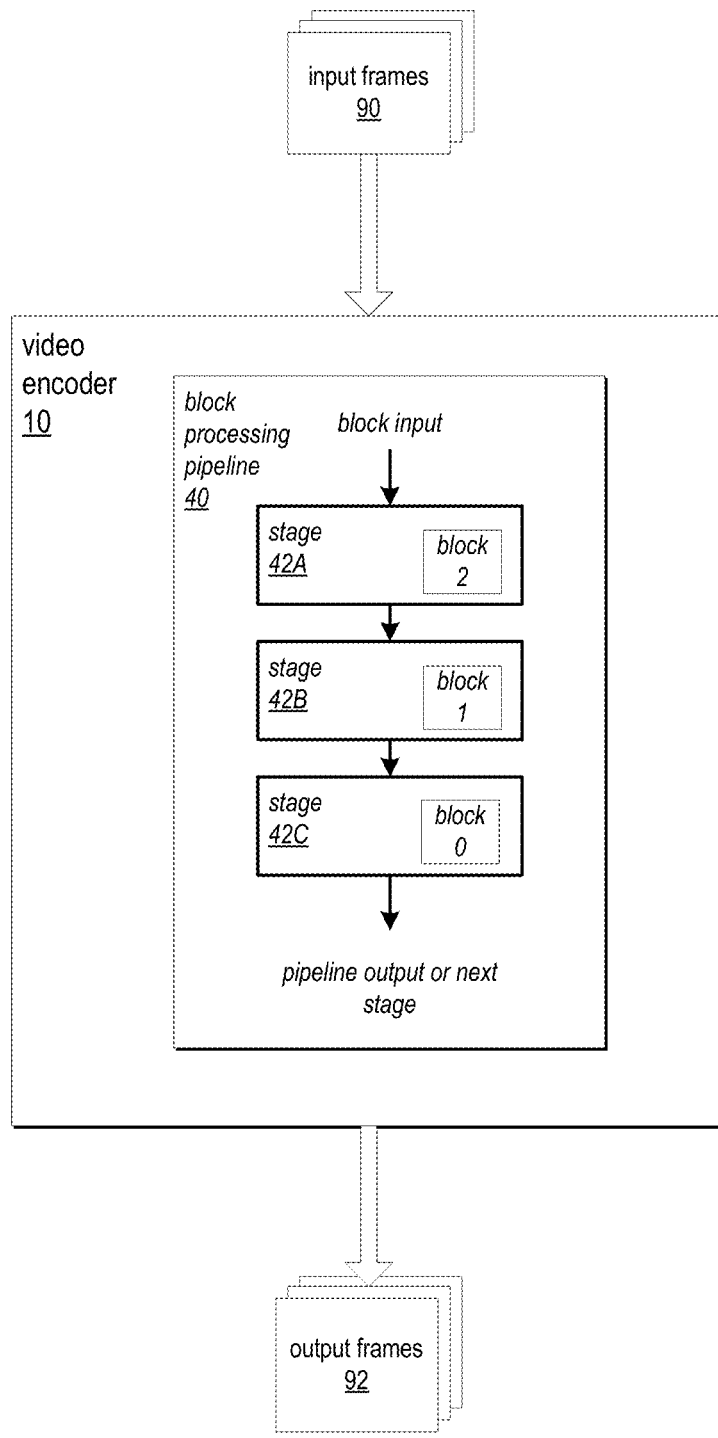
FIG. 1 illustrates an example video encoder including a conventional block processing pipeline that processes blocks from input frames in scan order.
Figure 2:
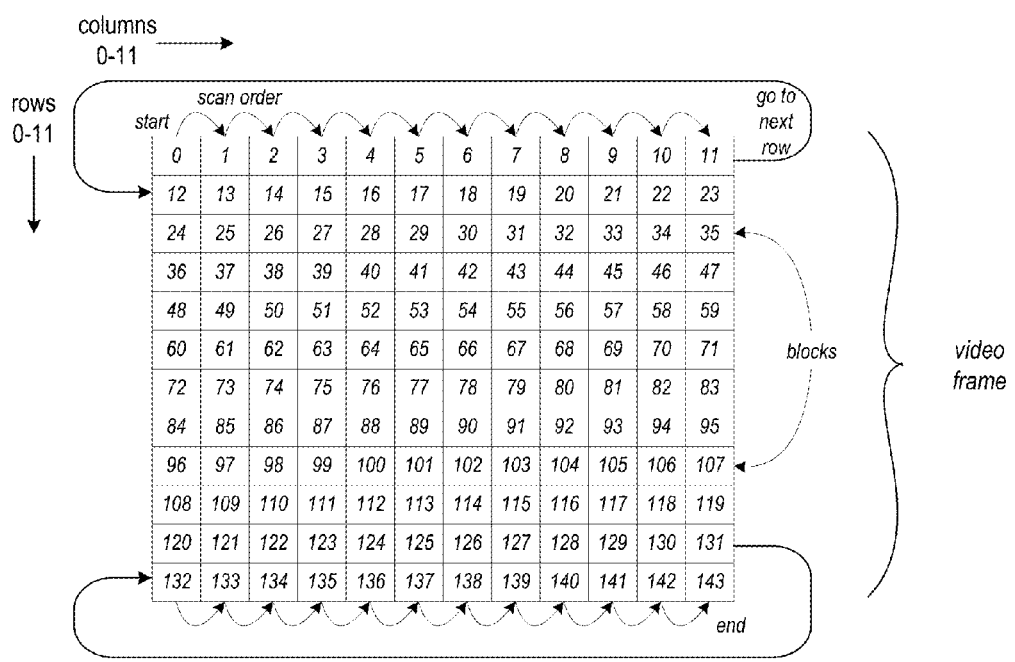
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 31:
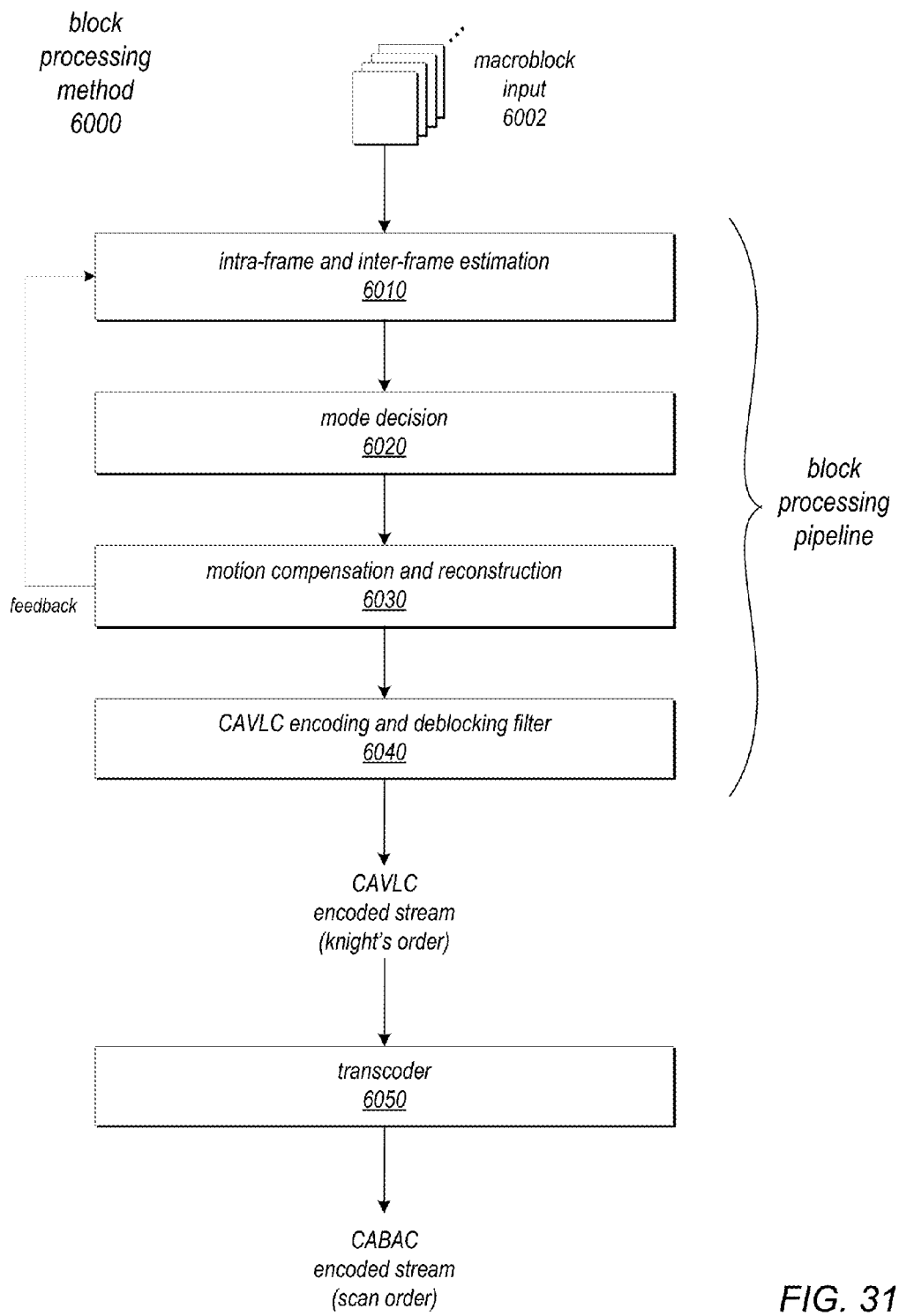
FIG. 31 is a high-level block diagram of general operations in an example block processing method that may be implemented by a block processing pipeline that implements one or more of the block processing methods and apparatus described herein, according to at least some embodiments.
Figure 32:
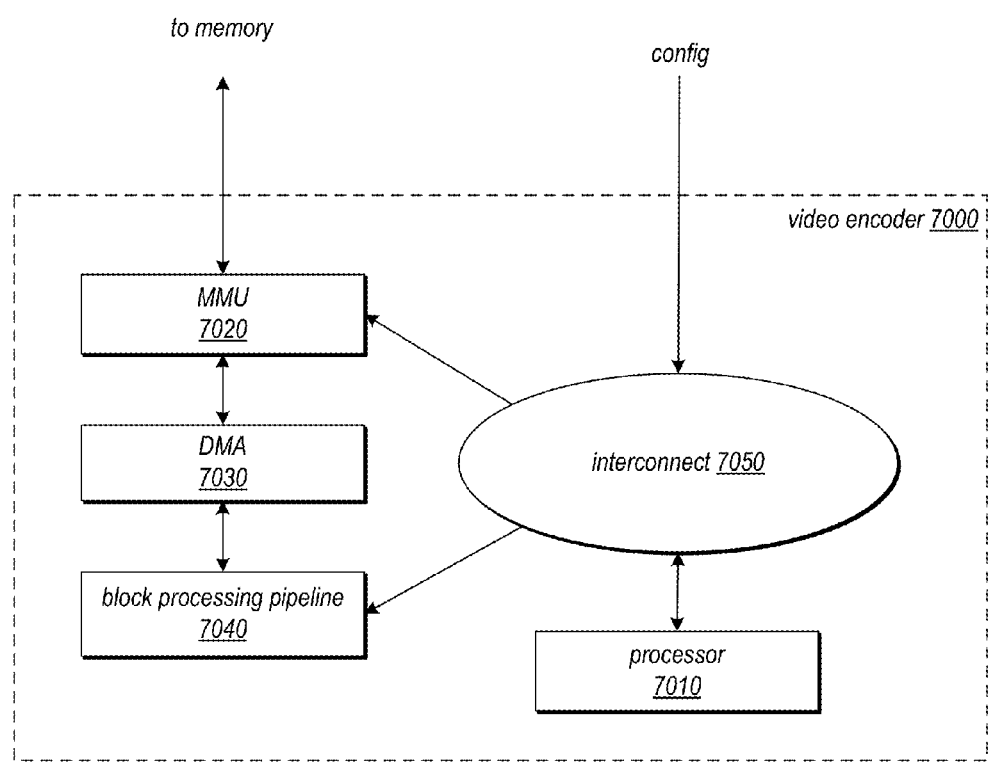
FIG. 32 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 31 illustrates an example block processing pipeline of an example H.264 video encoder, and FIG. 32 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Data Storage and Access in Block Processing Pipelines

Various embodiments of methods and apparatus for data storage and access in block processing pipelines are described. In at least some embodiments, a block processing pipeline may access input video frame data according to a linear memory addressing format based on a block request size of the memory system, for example 64 bytes. The block processing pipeline may also store and access reference data from processed frames according to one or more macroblock tile formats based on a block request size of the memory system, for example 64 bytes. In addition, macroblock data may be passed from one stage of the pipeline to a next stage according to a buffer memory format that supports different color formats (e.g., YCbCr 4:2:0, 4:2:2 and 4:4:4 formats) efficiently.

Figure 3:
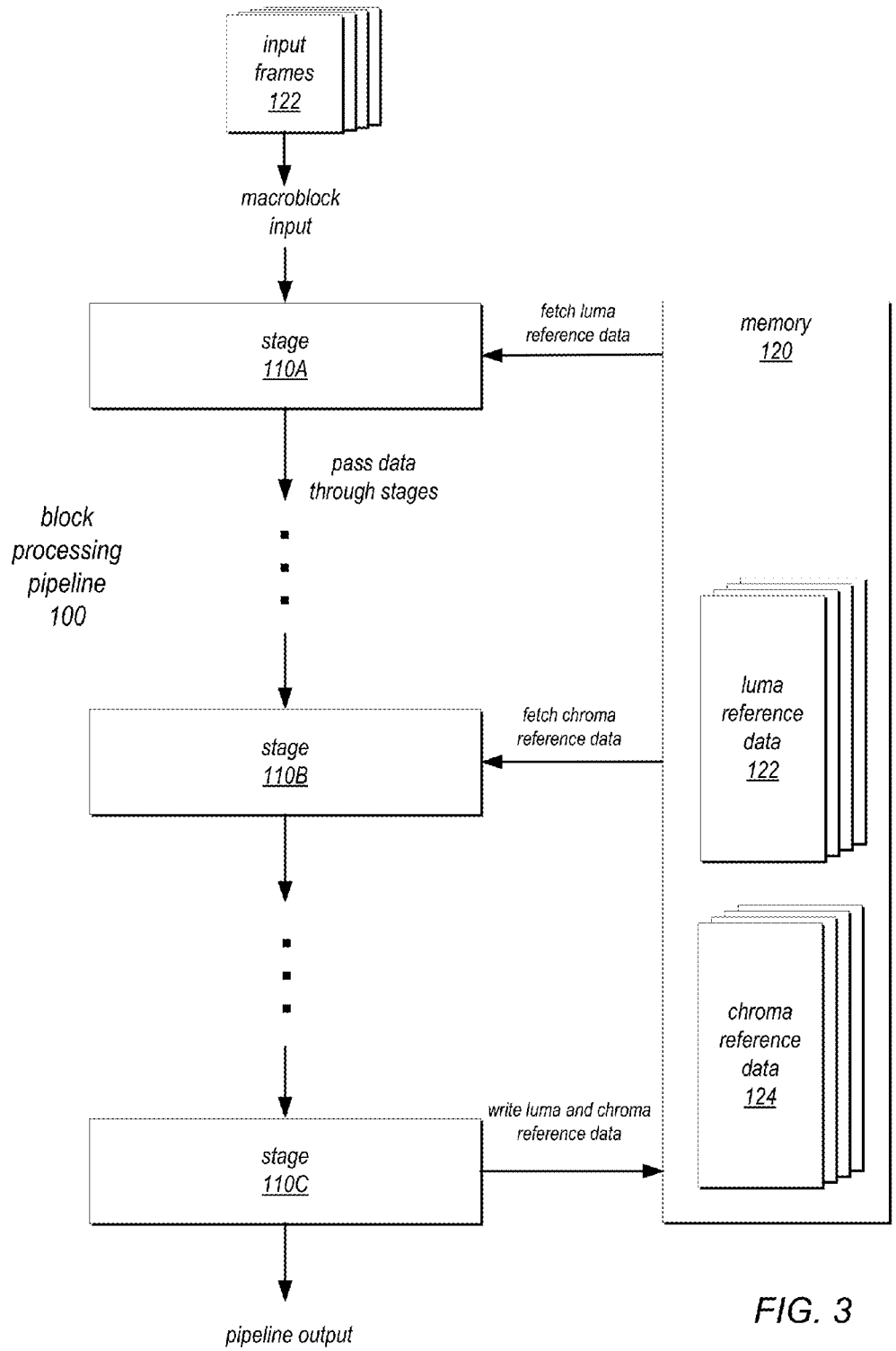
FIG. 3 illustrates an example block processing pipeline, according to at least some embodiments.

FIG. 3 illustrates an example block processing pipeline, according to at least some embodiments. A block processing pipeline 100 may obtain blocks of pixels from an input video frame and process each block at the stages 110 of the pipeline to generate an output video frame. In at least some embodiments, the block processing pipeline 100 may process the blocks of pixels from the input frame according to groups of rows (e.g., in row groups each containing four rows of blocks). In at least some embodiments, the block processing pipeline 100 may process blocks according to knight's order as described in the section titled Knight's order processing. In at least some embodiments, the input frames may be subdivided into and processed according to 16×16 pixel blocks referred to as macroblocks. In at least some embodiments, a macroblock may be composed of separate blocks of chroma and luma elements that may be processed separately at stages in the pipeline 100. The block processing pipeline 100 may process multiple input video frames to generate an output video stream. For example, an H.264 video encoder that includes a block processing pipeline as described herein may convert input video frames from an input format (e.g., 1080p (1920×1080 pixels, 2.1 megapixels) encoded in YCbCr color space) into H.264/AVC format.

One or more stages 110 of the pipeline 100 may process the macroblocks from a current video frame according to reference data from one or more previously processed video frames (referred to as reference frames) obtained from a memory 120 system that stores the reference data. For example, in FIG. 3, stage 110A fetches luma reference data for processing luma components of macroblocks in the pipeline 100, and stage 110B fetches chroma reference data for processing chroma components of macroblocks in the pipeline 100. A stage 110 at or near the end of the pipeline 100 (e.g., stage 110C in FIG. 3) may store processed macroblocks of pixels from the current video frame to the memory 120 system to be used as reference data when processing subsequent video frames. In at least some embodiments, luma reference data 122 and chroma reference data 124 from the processed blocks of a frame may be stored as separate reference data to the memory 120 system.

While embodiments of methods and apparatus for data storage and access are primarily described herein in reference to block processing pipelines that process 16×16 byte macroblocks and memory systems that support a block request size of 64 bytes, embodiments may be applied to pipelines that process blocks of other sizes (e.g., 6×16 pixel to 64×64 pixel CTUs as used in HEVC encoding) and/or that utilize memory systems with different block requests sizes (e.g., 16 byte, 32 byte, 128 byte, 256 byte, etc.)

Linear Memory Addressing Format

Figure 4:
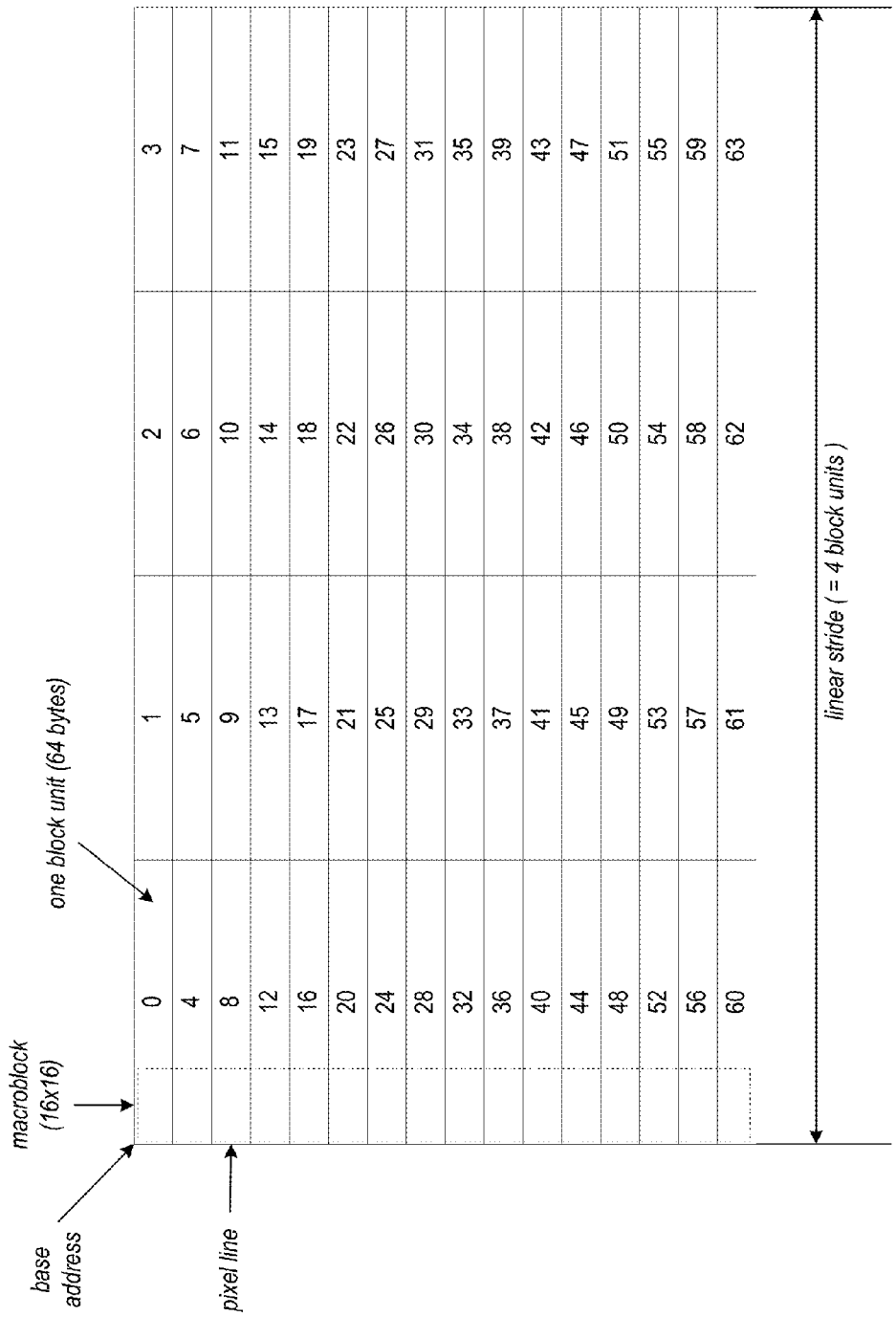
FIG. 4 graphically illustrates an example linear memory addressing format that may be used in at least some embodiments of a block processing pipeline.

FIG. 4 graphically illustrates an example linear memory addressing format that may be used in at least some embodiments of a block processing pipeline, and is not intended to be limiting. As an example, a block processing pipeline may read input video frame data from a memory according to a linear memory addressing format based on a block request size of the memory system, for example 64 bytes. In the linear memory addressing format, samples (e.g., pixels) are located in memory in sequential order. Linear stride specifies the distance in bytes between two adjacent vertical pixels. In at least some embodiments, the base address may be aligned on a 64-byte boundary, and linear stride is a multiple of 64 bytes (the block size). In the example given in FIG. 4, linear stride in bytes would be 4×64=256 bytes. In this example, each 64-byte block unit includes a horizontal line of 16 pixels from each of four 16×16 macroblocks; each macroblock is 16 lines, and thus 16 block units, high. A macroblock in the linear memory format is shown by the dashed rectangle.

When reading the input frame data from the source memory to input macroblocks to the pipeline, the data may be read in 64-byte block units in the linear order as shown in FIG. 4. Multiple pixel lines of block units may be read and locally stored. Each 64-byte block unit that is read and stored may be used for two or more (e.g., four) macroblocks.

Macroblock Tile Formats for Reference Data

Embodiments of block processing methods and apparatus are described in which reference data from macroblocks that have been processed by the pipeline are stored to the memory according to one or more tile formats that may reduce or minimize memory accesses needed to fetch the reference data from the memory system when compared to storing the reference data in scan order. When the block processing pipeline stores reference data from a current frame being processed to memory as a reference frame, instead of writing the reference samples from the processed macroblocks to memory in sequential order across the frame, the reference samples are stored to memory in macroblock sequential order. Each macroblock sample set is stored as a tile. In at least some embodiments, reference data may be stored separately in tile formats for luma and chroma samples. In at least some embodiments, chroma reference data may be stored in tile formats for one or more of YCbCr 4:2:0, 4:2:2 or 4:4:4 formats. Example tile formats for luma and for each chroma format are illustrated in FIGS. 6 through 10.

Figure 5A:
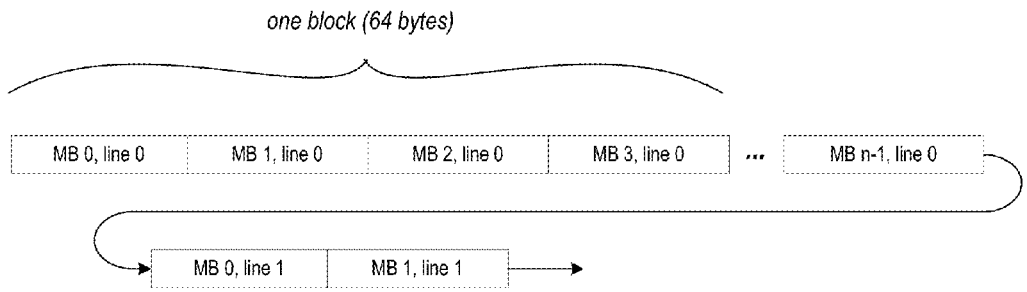
FIG. 5A graphically illustrates storing reference data in scan order.

FIG. 5A graphically illustrates storing reference data in scan order. A memory system may typically provide 64-byte block addressing. As an example of reference data, the luma component of a 16×16 macroblock is a 16×16 block of bytes. In scan order, the reference samples from the processed macroblocks would be written to memory in sequential order. As shown in FIG. 5A, in scan order, the first line of luma samples from the first macroblock on a row (MB 0) is followed in memory by the first line of MB 1 on the row, which is followed by the first line of MB 2, and so on. The second line of the first macroblock follows after the first line of the last macroblock on the row (MB n−1, where n is the number of macroblocks in a row). Thus, a 64-byte read from memory would include samples from four 16×16 blocks of bytes. To fetch a 16×16 luma block from a reference frame stored in scan order would require 16 separate 64-byte reads from memory, with one read for each of the 16 lines of the block. Three-quarters (48 bytes) of each read is data that is not needed.

Figure 5B:
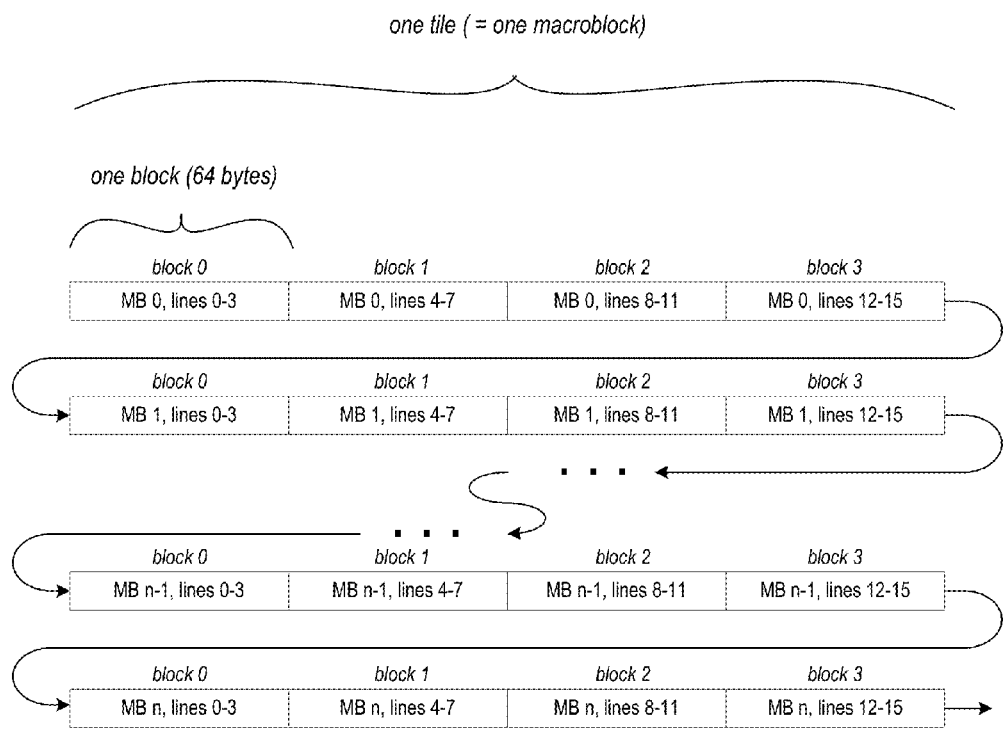
FIG. 5B graphically illustrates storing reference data in an example tile format, according to at least some embodiments.

FIG. 5B graphically illustrates storing reference data in an example tile format, according to at least some embodiments. When the block processing pipeline stores reference data from a current frame being processed to memory as a reference frame, instead of writing the reference samples from the processed macroblocks to memory in sequential order across the frame, the reference samples are stored to memory in macroblock sequential order. Each macroblock sample set is stored as a tile. Each tile may contain two or more 64-byte blocks of samples. Each 64-byte block includes two or more sequential horizontal lines of samples from the respective macroblock. For example, in FIG. 5B, block 0 of a tile includes the first four lines (lines 0-3) of the macroblock, block 1 includes lines 4-7, block 2 includes lines 8-11, and block 3 includes lines 12-15. The tile for the first macroblock on the first row of the frame (MB 0) is followed by the tile for the second macroblock on the row (MB 1), which is followed by the tile for the third macroblock on the row, and so on until the last macroblock on the row (MB n−1, where n is the number of macroblocks in a row). The tile for MB n−1 is followed by the tile for the first macroblock on the second row of the frame (MB n), which is followed by the tiles for the macroblocks on the second row in sequential order, and so on until the tile for the last macroblock on the last row of the frame.

By storing the reference data in the example tile format as shown in FIG. 5B instead of in scan order, fetching the reference data from a given macroblock in the reference frame can be performed by issuing four 64-byte read requests beginning at the start address for the macroblock. Each of the four reads returns 64 bytes of reference data from the given macroblock. Thus, fewer read requests are needed to fetch a given macroblock than would be needed if the reference data was stored in scan order, and each read is much more efficient as each read returns only reference data that is needed.

FIGS. 6 through 10 graphically illustrate example macroblock tile formats for luma and for each chroma format.

Figure 6:
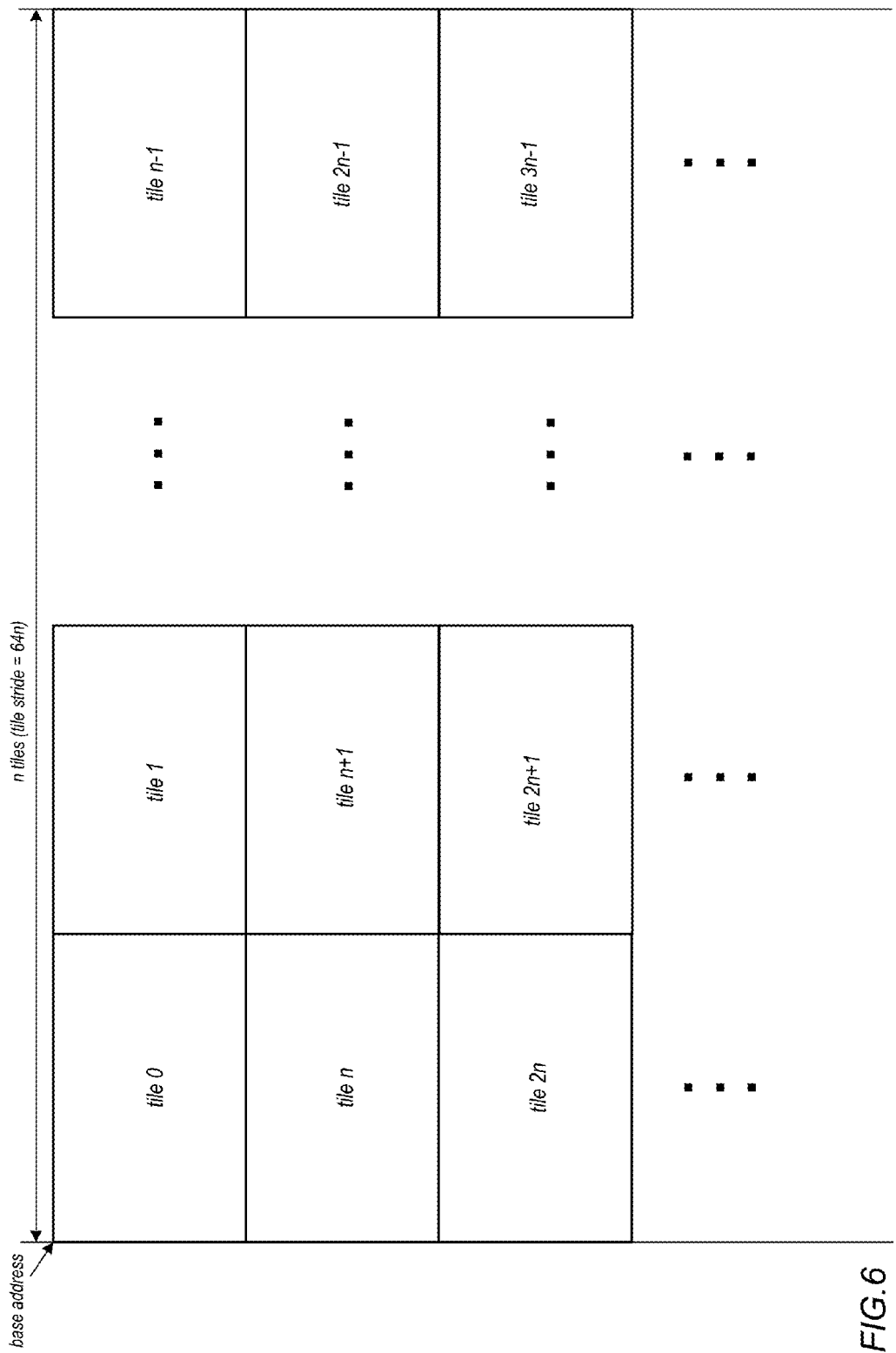
FIG. 6 graphically illustrates macroblock tile formats in memory for a video frame, according to at least some embodiments.

FIG. 6 graphically illustrates macroblock tile formats in memory for a video frame, according to at least some embodiments. Each tile corresponds to a macroblock of the frame. Tile 0 corresponds to a first macroblock on a first row of the frame, and tile 1 corresponds to tile 0's right neighbor macroblock on the row. The frame is n tiles wide, tile n−1 corresponds to the last macroblock of the first row of the frame, tile n corresponds to the first macroblock on the second row of the frame, and tile 2n corresponds to the first macroblock on the third row of the frame. Each tile is composed of two or more contiguous block units (e.g., 64-byte blocks) according to the block request size of the memory system. The number of 64-byte block units in a tile depends on the tile type (luma type or one of the chroma types) as illustrated in FIGS. 7 through 10. Tile stride specifies the distance in bytes between two vertically adjacent macroblocks, and is given by 64n. Reading linearly from memory from the base address, tile 0 would be read, followed by tile 1, and so on through the first row, continuing at tile n on the second row, and so on until the tile corresponding to the last macroblock of the frame is read.

Figure 7:
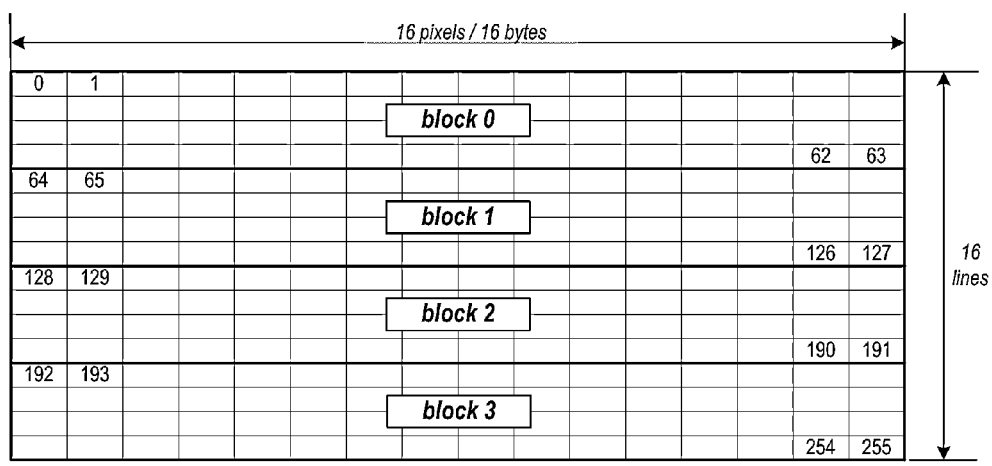
FIG. 7 graphically illustrates a luma tile format in memory, according to at least some embodiments.

FIG. 7 graphically illustrates a luma tile format in memory, according to at least some embodiments. A luma block from a macroblock is a 16×16 byte block of luma samples. As shown in FIG. 7, a luma tile includes four block units (e.g., 64-byte blocks) according to the block request size of the memory system. Block 0 includes the first four lines (lines 0-3) of luma samples from the luma block, block 1 the next four lines (lines 4-7), block 2 the next four lines (lines 8-11), and block 3 the last four lines (lines 12-15).

Figure 8:
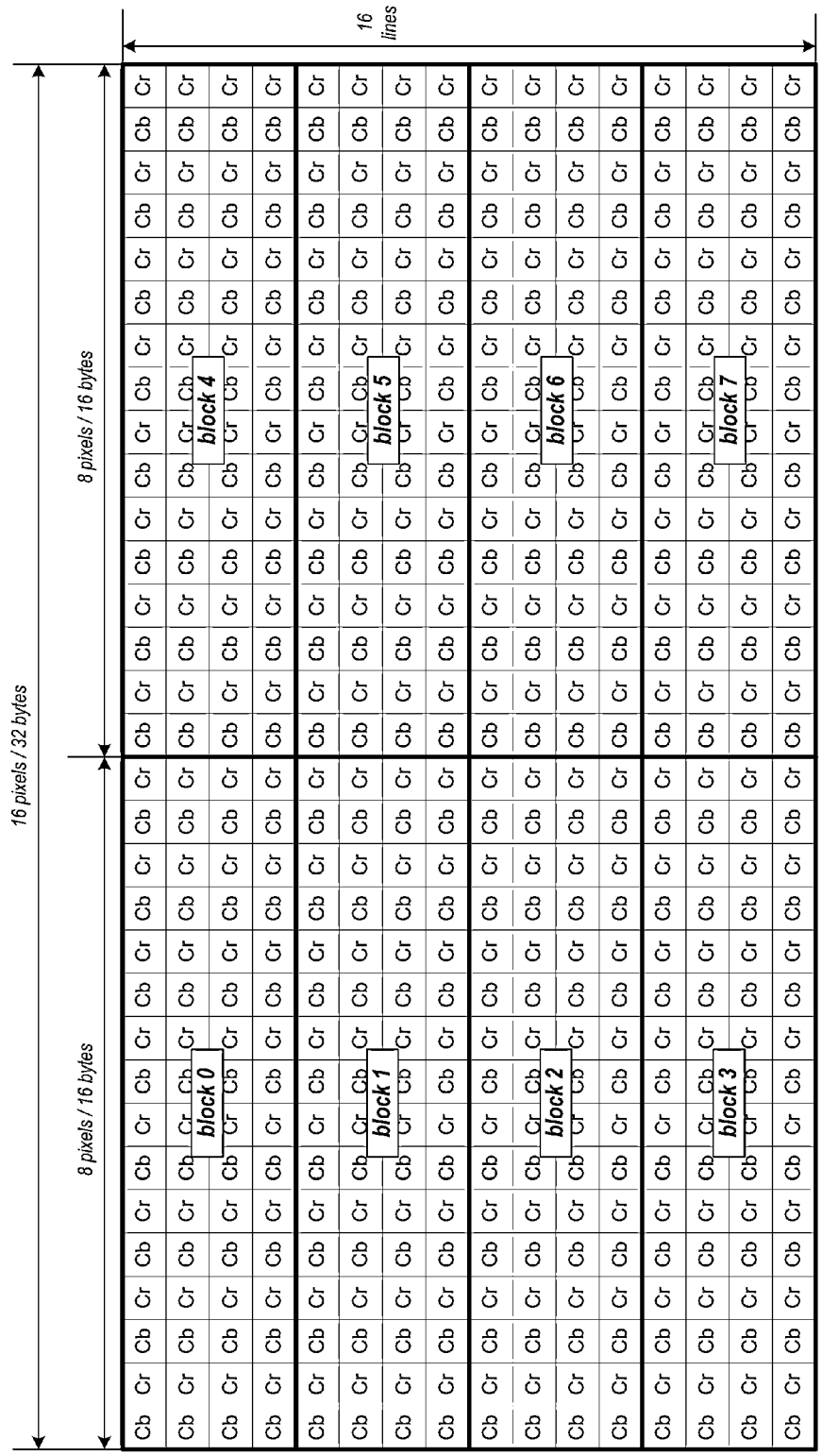
FIG. 8 graphically illustrates a tile format for chroma 4:4:4, according to at least some embodiments.
Figure 9:
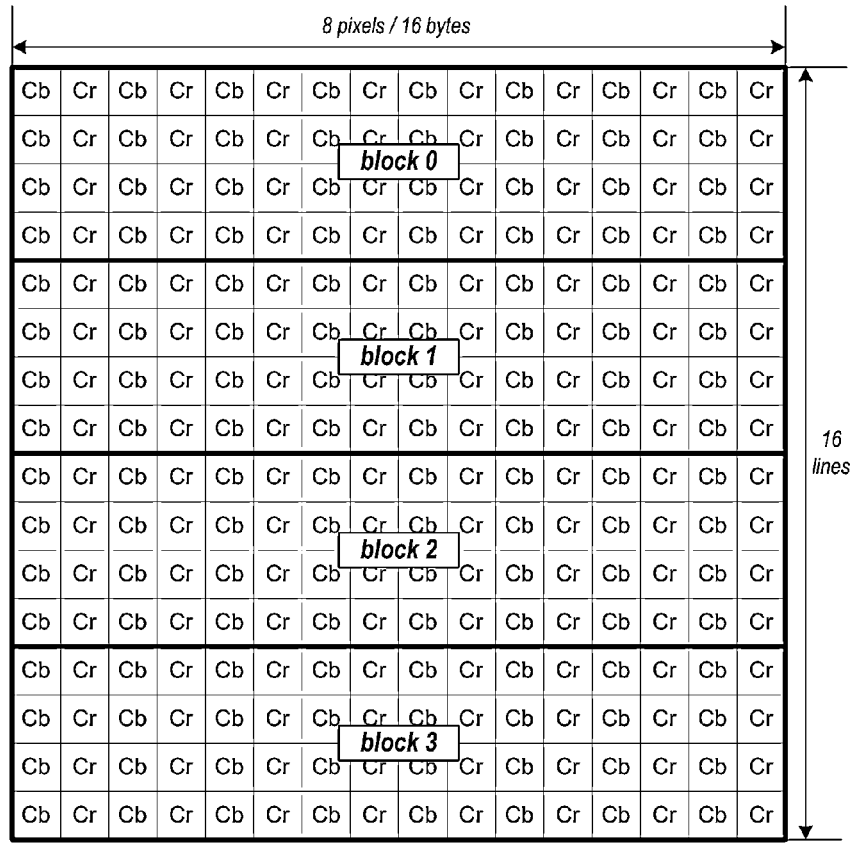
FIG. 9 graphically illustrates a tile format for chroma 4:2:2, according to at least some embodiments.
Figure 10:
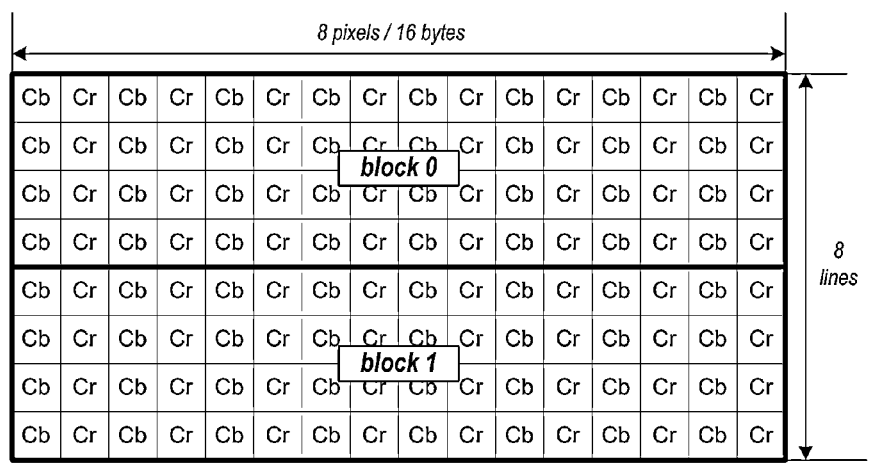
FIG. 10 graphically illustrates a tile format for chroma 4:2:0, according to at least some embodiments.

FIGS. 8 through 10 graphically illustrate example tile formats for chroma, according to at least some embodiments. A full size chroma block is 8×8, 8×16, or 16×16 pixels for chroma formats 4:2:0, 4:2:2 and 4:4:4, respectively. However, each chroma pixel has a Cb (blue-difference) and a Cr (red-difference) chroma component. Thus, in chroma format, each pixel is represented by two bytes (Cb/Cr). Thus, tile sizes in bytes for chroma formats 4:2:0, 4:2:2 and 4:4:4 are 16×8, 16×16, and 32×16, respectively. As shown in FIGS. 8-10, the Cb and Cr components may be interleaved. FIG. 8 graphically illustrates a tile format for chroma 4:4:4, according to at least some embodiments. In chroma 4:4:4 tile format, each tile includes eight 16×4 64B blocks. Blocks 0-3 include the left eight columns of chroma pixels, while blocks 4-7 include the right eight columns of chroma pixels. Note that, in memory, blocks 0-7 are arranged sequentially. FIG. 9 graphically illustrates a tile format for chroma 4:2:2, according to at least some embodiments. As shown in FIG. 9, in chroma 4:2:2 tile format, each tile includes four 16×4 64B blocks. FIG. 10 graphically illustrates a tile format for chroma 4:2:0, according to at least some embodiments. As shown in FIG. 10, in chroma 4:2:0 tile format, each tile includes two 16×4 64B blocks.

Writing Reference Data to Memory in Tile Formats in a Block Processing Pipeline

Referring again to FIG. 3, a block processing pipeline 100 may process blocks of pixels from an input frame according to groups of rows (e.g., in row groups each containing four rows of blocks). In at least some embodiments, the block processing pipeline 100 may process blocks according to knight's order as described in the section titled Knight's order processing. A stage 110C at or near the end of the block processing pipeline may write luma 122 and chroma 124 reference data to a memory 120 according to the macroblock tile formats described above.

Figure 11:
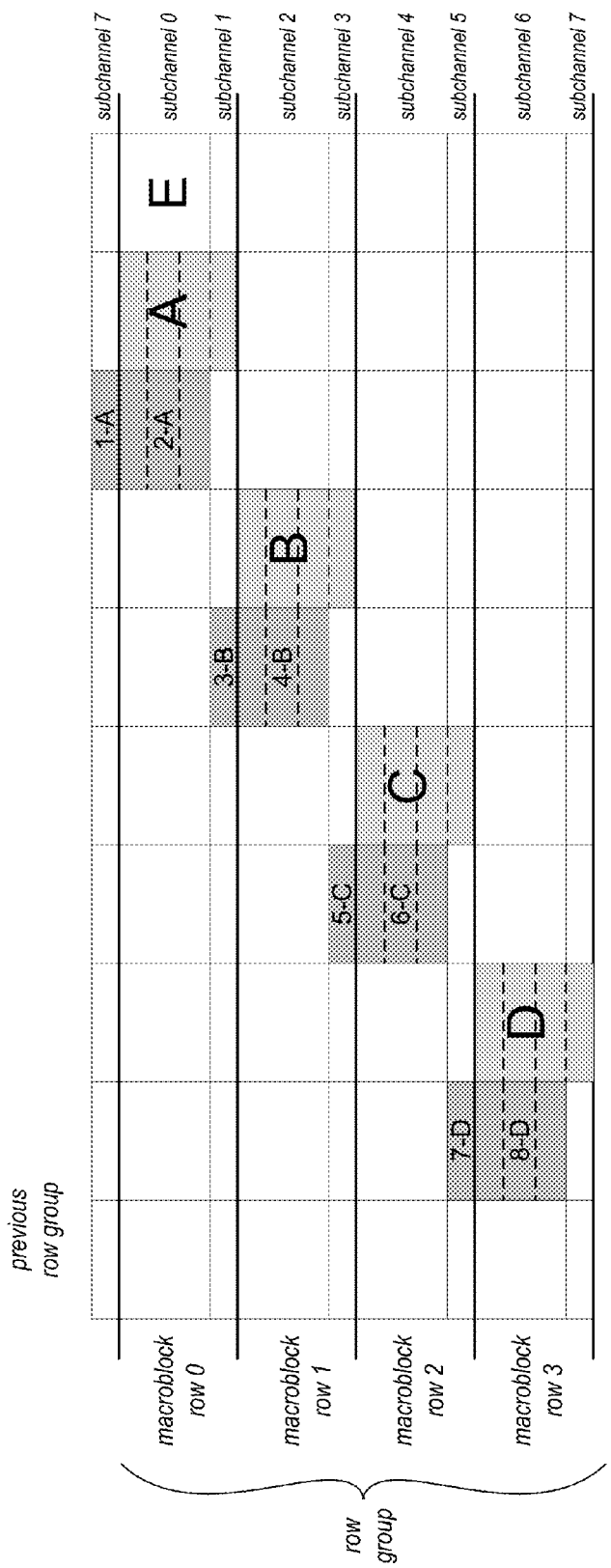
FIG. 11 illustrates a write order for reference data in a block processing pipeline, according to at least some embodiments.

FIG. 11 illustrates a write order for reference data in a block processing pipeline, according to at least some embodiments. FIG. 11 shows a row group of four rows of macroblocks (rows 0 through 3). The pipeline processes the macroblocks according to the row groups. Assuming the block labeled A is the current macroblock being processed at stage 110C, the next three macroblocks to be processed at the stage according to knight's order will be B, C, and D. After block D, the next macroblock processed is block E, which is block A's right neighbor.

In at least some embodiments, the stage 110C may write reference data for macroblocks to the memory 120 according to a modified knight's order, as shown in FIG. 11. In at least some embodiments, the stage 110C delays writing the reference data from the macroblocks until the reference data for the macroblocks has been fully processed at the stage. Some pipeline operations performed on a current macroblock at a stage may access and possibly modify pixel data in neighbor macroblocks when processing the current macroblock. For example, in at least some embodiments, the stage 110C that writes the reference data may implement a deblocking filter that receives reconstructed macroblock luma and chroma pixels from upstream stage(s) of the block processing pipeline and performs filtering on the macroblock data, for example according to the H.264 Recommendation. However, when processing a current macroblock at the stage (e.g., block A in FIG. 11), some pixels of the left neighbor and top left neighbor blocks may be affected. Thus, the stage 110C delays writing a portion of the reference data for these macroblock(s) until block A has been processed.

In at least some embodiments, the stage 110C writes one macroblock (256 bytes) of reference data to memory at each macroblock cycle, except for special cases at the top and bottom of a frame, with a portion of the reference data (one 64-byte block) coming from the row above the current macroblock being processed at the stage (and thus from the previous row group for the top row of the current row group), and the rest (three 64-byte blocks) coming from the left neighbor of the current macroblock. For example, referring to FIG. 11, stage 110C may write the reference data labeled 1-A (four pixel lines, one 64-byte block) and 2-A (12 pixel lines, three 64-byte blocks, 192 bytes) to memory after processing block A, reference data labeled 3-B and 4-B to memory after processing block B, and so on for blocks C (5-C and 6-C) and D (7-D and 8-D).

In at least some embodiment, the luma and chroma reference data from a row group is written to the memory via direct memory access (DMA), with a separate DMA channel for each of luma and chroma. In at least some embodiments, the luma and chroma reference data for a row group is written to a memory according to a set of DMA subchannels (e.g. eight subchannels labeled 0-7 as shown in FIG. 11), with two subchannels for each row, the first of which writes the top 12 pixel lines of a macroblock and the second of which writes the bottom 4 pixel lines of a macroblock. For example, the first 12 lines of pixels of the macroblocks on row 0 may be written via subchannel 0, and the last 4 lines of pixels of the macroblocks on row 0 may be written via subchannel 1.

Figure 12:
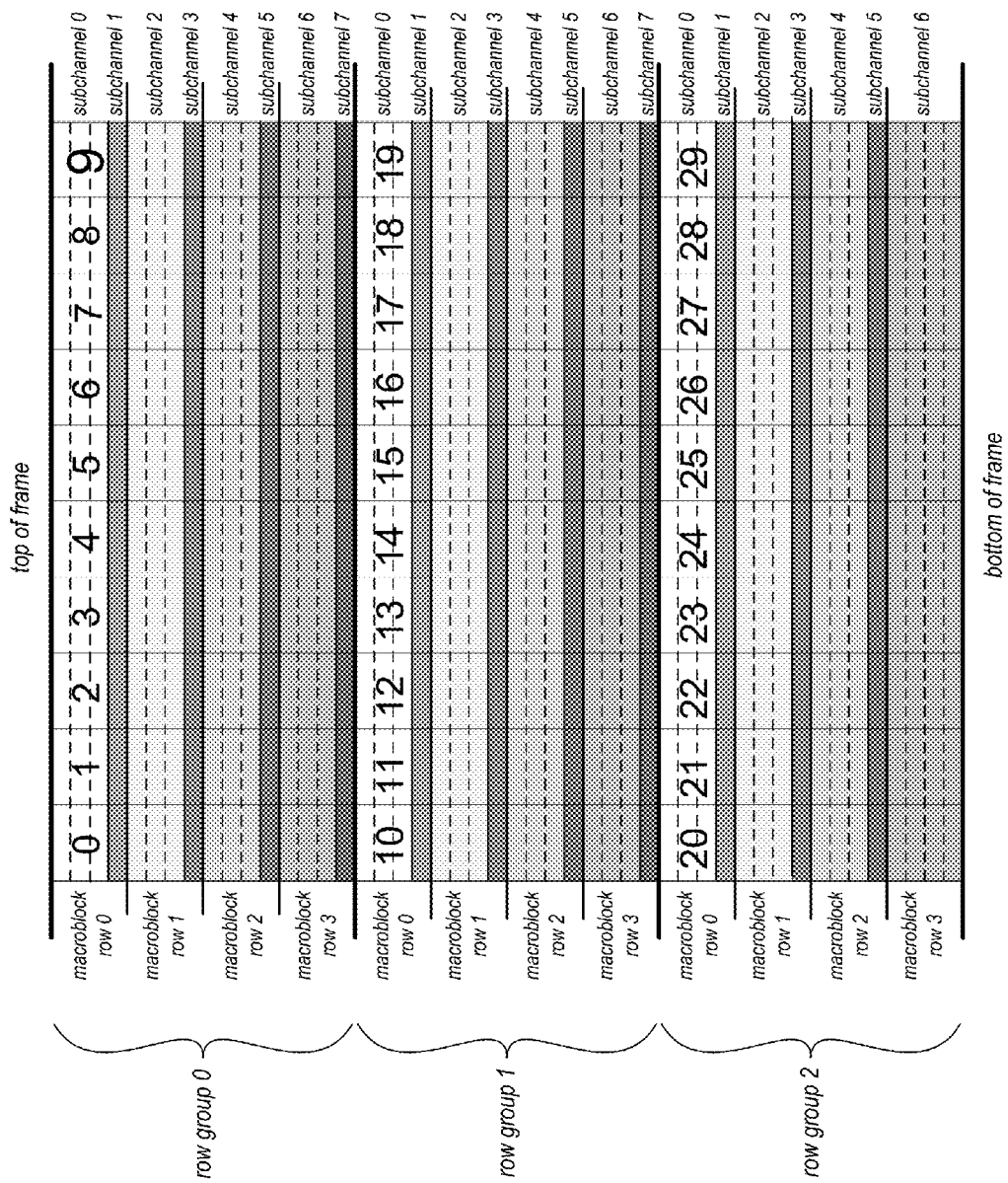
FIG. 12 illustrates the write order for both luma and chroma reference data for an entire example frame when processed by row groups in a block processing pipeline, according to at least some embodiments.

FIG. 12 illustrates the write order for both luma and chroma reference data for an entire example frame when processed by row groups in a block processing pipeline, according to at least some embodiments. In this example, the block processing pipeline processes the frame according to row groups (groups 0 through 2 in FIG. 12), each row group including four rows of macroblocks (rows 0 through 3). The luma and chroma reference data for each row group is written to memory according to a set of DMA subchannels (subchannels 0-7 in FIG. 12). The following table (Table 1) shows the subchannels for a row group including four macroblock (MB) rows, according to at least some embodiments:

TABLE 1

| Subchannel | MB row | Pixel lines | Description |
| --- | --- | --- | --- |
| 0 | 0 | 0-11 | First 12 pixel lines of MB |
| 1 | 0 | 12-15 | Last 4 pixel lines of MB |
| 2 | 1 | 0-11 | First 12 pixel lines of MB |
| 3 | 1 | 12-15 | Last 4 pixel lines of MB |
| 4 | 2 | 0-11 | First 12 pixel lines of MB |
| 5 | 2 | 12-15 | Last 4 pixel lines of MB |
| 6 | 3 | 0-11 | First 12 pixel lines of MB (All 16 lines on last row of frame) |
| 7 | 3 | 12-15 | Last 4 pixel lines of MB (Not used on last row of frame) |

Note that four pixel lines of a 16×16 macroblock is one 64-byte memory block. Each subchannel keeps track of the data within its pixel lines, and sends the data to memory in a tiled linear order as shown for subchannel 0 (MB row 0, pixel lines 0-11) in FIG. 12.

In at least some embodiments, each subchannel requires a starting memory block address, a frame block width, and frame height (multiple of 16 pixels). In at least some embodiments, even subchannels (0, 2, 4, 6) start by storing the memory block located at the starting memory block address followed by the two memory blocks below it. The subchannel then accesses the next column of three memory blocks to the right. This continues until the subchannel reaches the frame block width. The subchannel then skips the next 52 rows of pixels before starting back at the left edge and repeating columns of three memory blocks. This repeats until the frame height is reached. The last macroblock row in the frame is a special case in which four memory blocks are written instead of three. In at least some embodiments, odd sub-channels (1, 3, 5, 7) start by storing the memory block located at the starting memory block address followed by the next memory block to the right. This continues until the subchannel reaches the frame block width. The subchannel then skips the next 60 rows of pixels before starting back at the left edge of the frame.

In at least some embodiments, subchannels as described above may be used for luma reference data frames and chroma reference data frames. For chroma frames, there are three formats: 4:4:4, 4:2:2, and 4:2:0. In 4:4:4 chroma format, the frame height is the same as luma, but the frame block width is twice that of luma as each chroma pixel has two components (Cb and Cr). In 4:2:2 chroma format, the frame height and frame block width are the same as luma. In 4:2:0 chroma format, the frame height is half that of luma and the frame block width is the same as luma.

Figure 13:
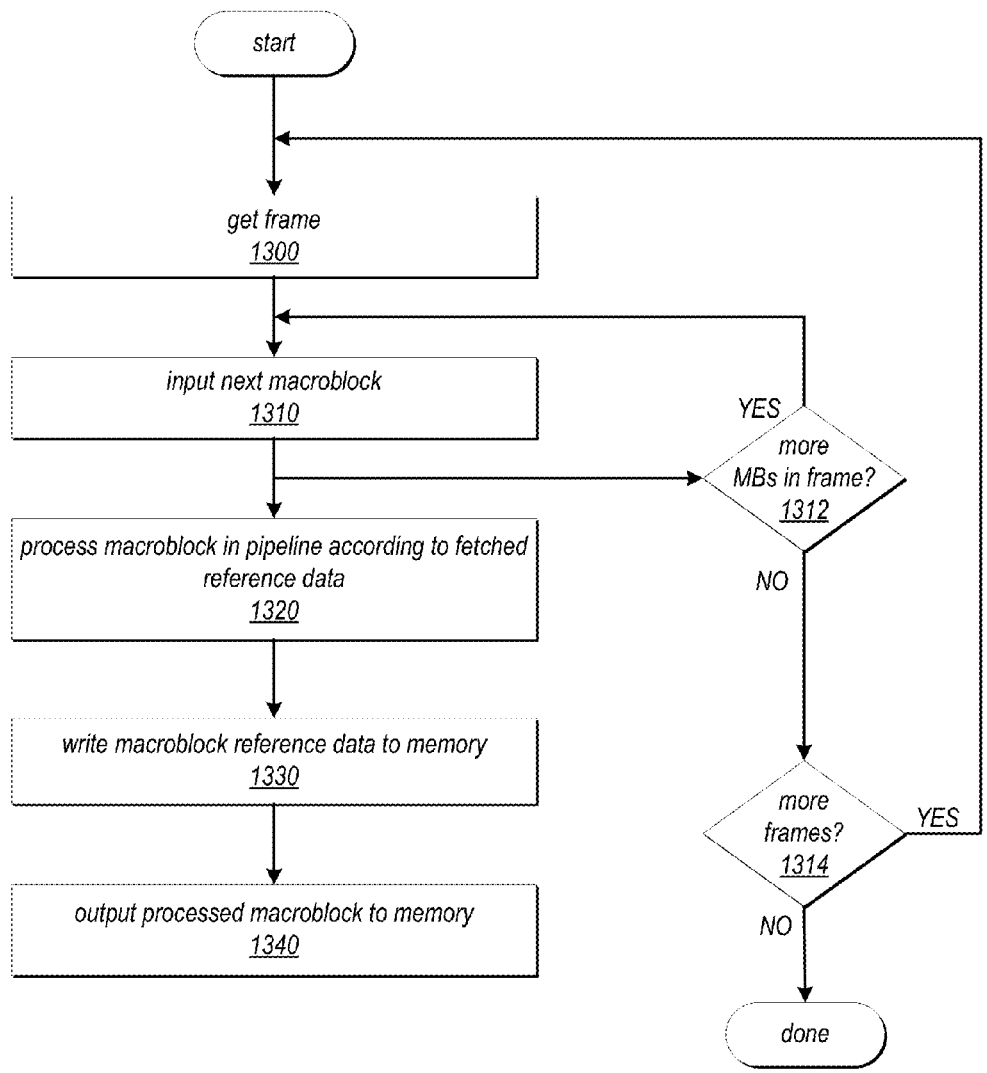
FIG. 13 is a high-level flowchart of a block processing pipeline method for processing video frames in which reference data is written to and accessed from a memory, according to at least some embodiments.

FIG. 13 is a high-level flowchart of a block processing pipeline method for processing video frames in which reference data is written to and accessed from a memory, according to at least some embodiments. As indicated at 1300, a frame to be processed by the block processing pipeline may be obtained. As indicated at 1310, a next macroblock may be input to the pipeline for processing. In at least some embodiments, macroblocks may be input to the pipeline according to a knight's order processing method as described in the section titled Knight's order processing. As shown by element 1312, macroblocks (MBs) are input to the pipeline from the frame as long as there are macroblocks remaining in the frame to be processed. As shown by element 1314, when all the macroblocks in a frame have been input to the pipeline for processing, if there are more frames to be processed, then the method returns to 1300 to get the next frame.

Figure 15:
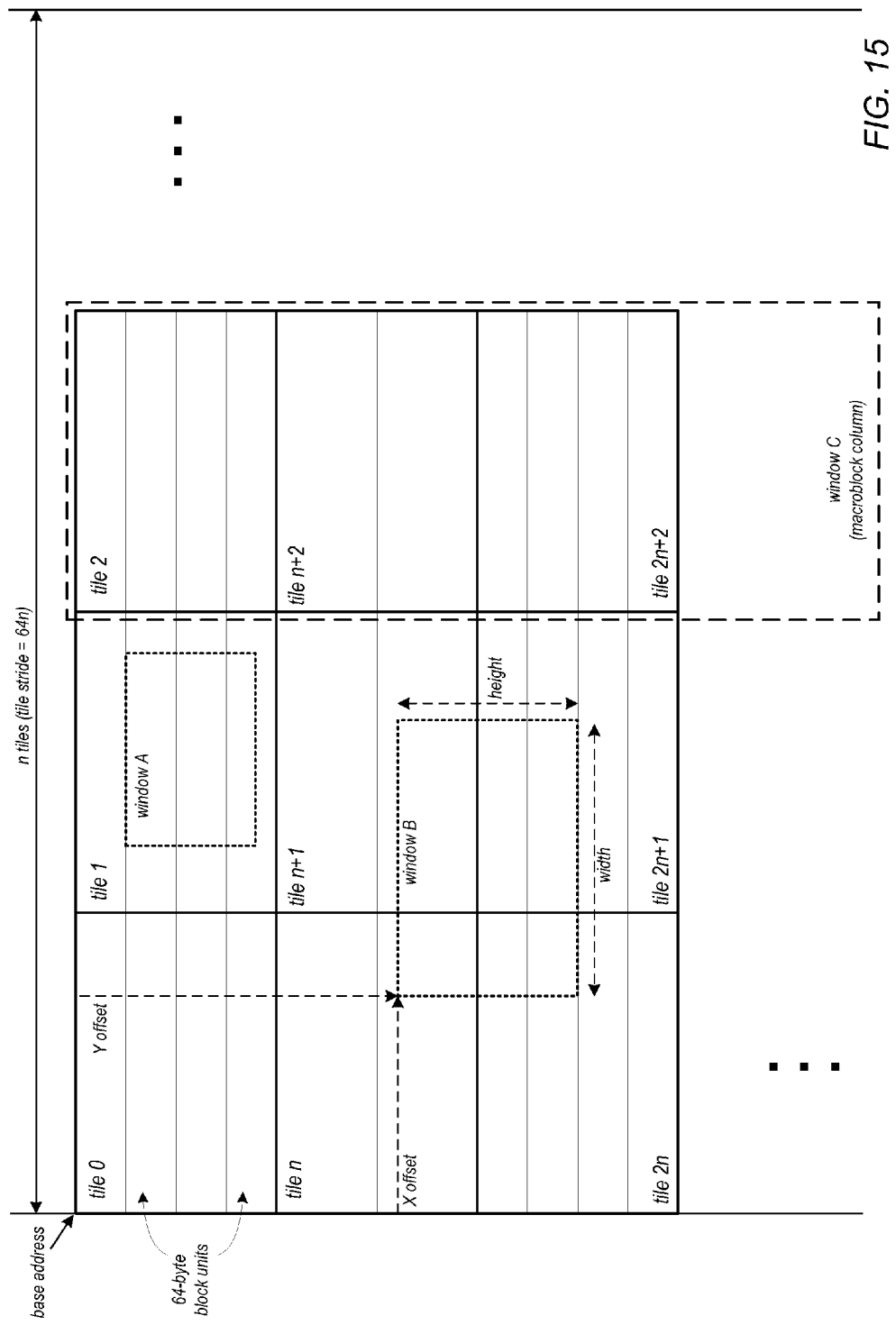
FIG. 15 graphically illustrates fetching or prefetching reference data from a reference frame that stores the reference data in a macroblock tile format, according to at least some embodiments.

As indicated at 1320, each macroblock that is input to the pipeline may be processed at the stages of the pipeline. At least some stages may process a macroblock according to reference data from one or more previously processed frames. The reference data may include chroma and/or luma reference data. (Note that for an initial frame in a video sequence there may be no previously processed frames, so the macroblocks in this frame may be processed without reference to previously processed frames). The luma or chroma reference data for a particular macroblock may be fetched or pre-fetched from a memory that stores the reference data in reference frame(s) according to a macroblock tile format or formats as shown in FIGS. 5B through 10. FIG. 15 provides some examples of fetching or prefetching reference data from an example tile format reference frame in memory.

Figure 14:
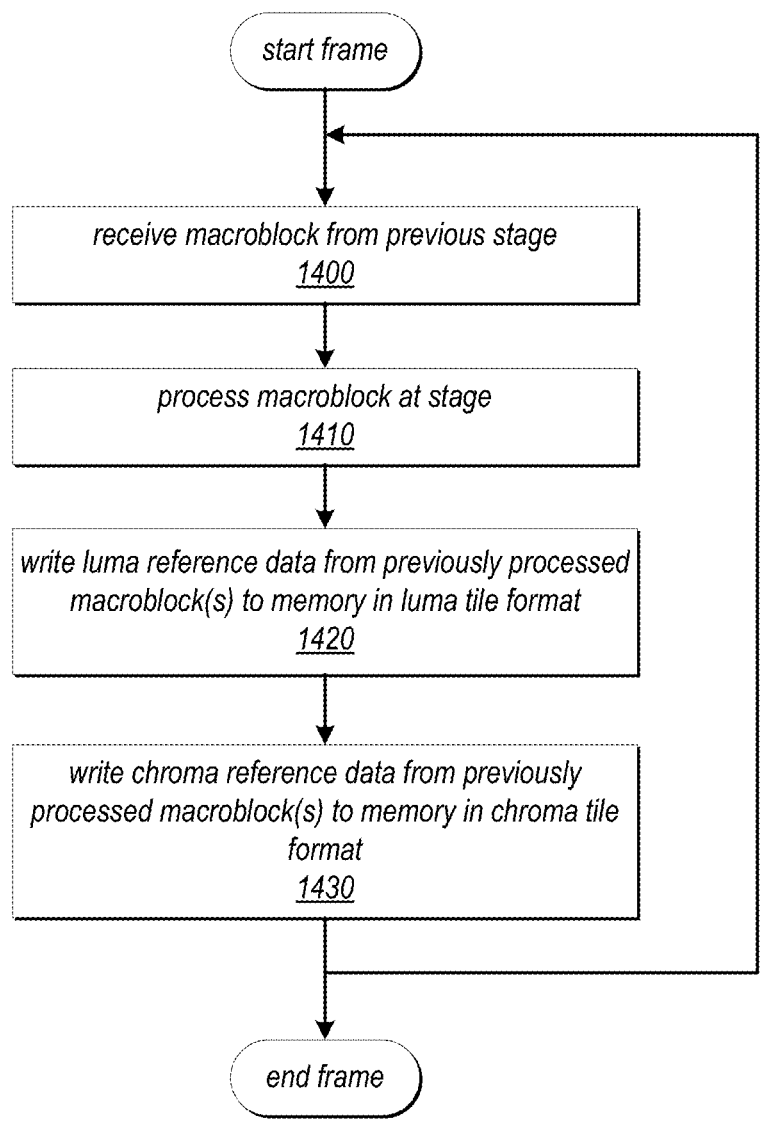
FIG. 14 is a flowchart of a method for writing reference data to a memory at a stage of a block processing pipeline, according to at least some embodiments.

As indicated at 1330, for each macroblock that is processed by the pipeline, luma and chroma reference data for the macroblock may be written to the memory according to the macroblock tile format(s), for example as shown in FIGS. 5B through 10. Methods for writing reference data to memory in macroblock tile formats are shown in FIGS. 11 and 12. In at least some embodiments, the luma and chroma reference data from a macroblock may be written to the memory by a last stage of the pipeline. In at least some embodiments, writing reference data for a macroblock at the last stage may be delayed for one or more pipeline cycles until the stage is done with the macroblock, for example as illustrated in FIG. 11. FIG. 14 provides more detail on writing reference data to memory at a stage of the pipeline.

Note that the pipeline may generate reference data in macroblock tile format from each input frame processed by the pipeline. Also note that macroblocks from a current frame in the pipeline may be processed according to reference data from one, two or more previously processed frames. For example, a motion estimation component of a block processing pipeline may implement two or more motion estimation engines that each process a given macroblock according to two or more different reference frames.

As indicated at 1340, each processed macroblock is output to a memory, for example as an encoded output stream such as a CAVLC (context-adaptive variable-length coding) encoded output stream or CABAC (context-adaptive binary arithmetic coding) encoded stream. Note that this is separate output from the reference data output; the reference data output is used by the pipeline in processing subsequent frames, and thus does not need to be in an encoded output stream format.

FIG. 14 is a flowchart of a method for writing reference data to a memory at a stage of a block processing pipeline, according to at least some embodiments. The method of FIG. 14 may, for example, be implemented at element 1330 of FIG. 13. The stage may be at or near the end of the block processing pipeline. As indicated at 1400, the stage may receive a macroblock from a previous stage of the pipeline.

As indicated at 1410, the stage may process the macroblock. Processing the macroblock may involve accessing pixels from one or more neighbor macroblocks, for example the left neighbor and top-left neighbor macroblocks. For example, the stage may implement a deblocking filter that receives reconstructed macroblock luma and chroma pixels from upstream stage(s) of the block processing pipeline and performs filtering on the macroblock data, for example according to the H.264 Recommendation. When filtering a current macroblock at the stage, some pixels of the left neighbor and top left neighbor blocks may be affected. Thus, writing the reference data for macroblocks to memory may be delayed by several pipeline cycles (e.g., 4 cycles) until the macroblocks have been fully processed by the last stage, as shown in FIG. 11. As indicated at 1420, after processing the current macroblock at the stage, the luma reference data from one or more previously processed macroblocks may be written to memory in a luma tile format, for example as shown in FIG. 7. As indicated at 1430, after processing the current macroblock at the stage, the chroma reference data from one or more previously processed macroblocks may also be written to memory in a chroma tile format, for example as shown in FIGS. 8-10.

FIG. 15 graphically illustrates fetching or prefetching reference data from a reference frame that stores the reference data in a macroblock tile format, according to at least some embodiments. Each tile corresponds to a macroblock of the reference frame. Tile 0 corresponds to a first macroblock on a first row of the reference frame, tile 1 corresponds to tile 0's right neighbor macroblock on the row, and so on. The frame is n tiles wide; tile n corresponds to the first macroblock on the second row of the reference frame, and tile 2n corresponds to the first macroblock on the third row of the reference frame. Each tile is composed of two or more contiguous block units (e.g., 64-byte blocks) according to the block request size of the memory system. The number of 64-byte block units in a tile depends on the tile type (luma type or one of the chroma types) as illustrated in FIGS. 7 through 10. This example shows four 64-byte blocks per tile, with each block including four 16-byte pixel lines. Tile stride specifies the distance in bytes between two vertically adjacent macroblocks (e.g., tiles 0 and n), and may be given by 64n. Reading linearly from memory starting at the base address, tile 0 would be read first, followed by tile 1, and so on through the first row, continuing at tile n on the second row, and so on until the tile corresponding to the last macroblock of the frame is read.

FIG. 15 shows three different example windows that may be fetched or prefetched from a reference frame, according to at least some embodiments. Window A is an example of a window of pixels that lies within a macroblock that corresponds to tile 1. Window B is an example of a window of pixels that extends across two or more macroblocks and thus two or more tiles. Window C is an example of a column of one, two, or more macroblocks that may be fetched from a reference frame.

In at least some embodiments, to fetch or prefetch a window (e.g., window B) from a reference frame in memory requires the base address of the reference frame, an X offset (in bytes) and Y offset (in pixel lines) to the beginning of the window, the width (in bytes) and height (in pixel lines) of the window, and the tile stride for the reference frame in block units (64 bytes per block). In at least some embodiments, the offsets and sizes are specified in multiples of 16.

As previously mentioned (see, e.g., FIG. 5B), the 64-byte block units in each tile are sequentially located in memory. To read a column of macroblocks (e.g., window C), the start address of the first block unit in tile 2 may be determined, and four sequential 64-byte reads beginning at the start address may be issued to fetch tile 2. The start address of the first block unit in tile n+2 can be calculated, for example according to the tile stride, and four sequential 64-byte reads beginning at the start address of tile n+2 may be issued. One or more additional macroblocks/tiles in the column may be similarly fetched.

A window to be fetched or prefetched may lie within a tile (e.g., window A). The window may be fetched by determining a start address of the window and issuing one, two, or more sequential 64-byte reads to read at least the block units within the tile that include portions of the window. For example, in the example window A, at least the last three 64-byte block units of tile 1 may be read from memory to fetch the required window of pixels.

A window to be fetched or prefetched may overlap portions of two or more tiles (e.g., window B). The window may be fetched by determining start addresses for portions of the window in different tiles and issuing 64-byte reads to read at least the block units within the tiles that include portions of the window B.

Macroblock Input and Inter-Stage Data Formats

In at least some embodiments, a block processing pipeline may access input video frame data according to a linear memory addressing format based on a block request size of 64 bytes, as shown in FIG. 4. In at least some embodiments, a first stage of the pipeline may be a macroblock input stage that reads macroblocks from an input frame according to the linear format as shown in FIG. 4, buffers the macroblocks, and writes the macroblock data to a next stage of the pipeline according to an input order (e.g., a knight's order) to begin the pipeline processing of the macroblocks. In at least some embodiments, macroblock data from an input video frame may be passed from one stage of the pipeline to the next stage according to pipeline buffer formats that support different chroma formats (e.g., chroma 4:2:0, 4:2:2 and 4:4:4 formats) efficiently, as well as luma data.

In at least some embodiments, stages of a block processing pipeline may include a buffer memory to which a previous stage of the pipeline passes macroblock data to be processed. In at least some embodiments, the stage buffer memory may be double-buffered so that the stage can read and process data for a current macroblock while data for a next macroblock is being written to the memory from a previous stage. In at least some embodiments, the interface to the buffer memory may be a 128-bit (16-byte) interface. In at least some embodiments, both luma data and chroma data from each macroblock may be written to the buffer of the next stage. FIGS. 16 through 22 illustrate luma and chroma data formats that may be used in passing macroblock data from one stage to a next stage's buffer memory. Collectively, these data formats may be referred to as pipeline buffer formats.

Figure 16:
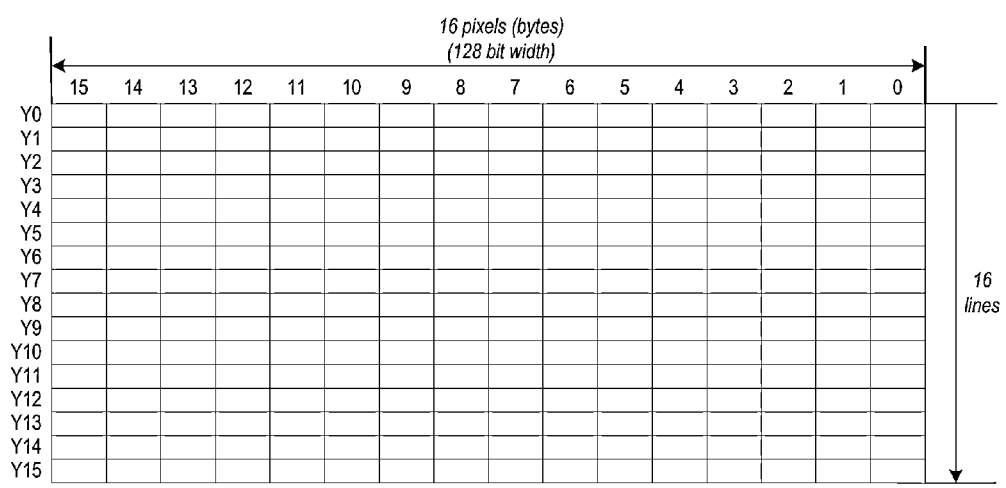
FIG. 16 illustrates a luma data format that may be used in the stage buffer memory, according to at least some embodiments.

FIG. 16 illustrates a luma data format that may be used in the stage buffer memory, according to at least some embodiments. As shown in FIG. 16, the luma pixel data from a macroblock is organized in the buffer memory in scan order, with 16 128-bit lines (Y0-Y15), each line including 16 luma bytes (0-15).

Figure 17:
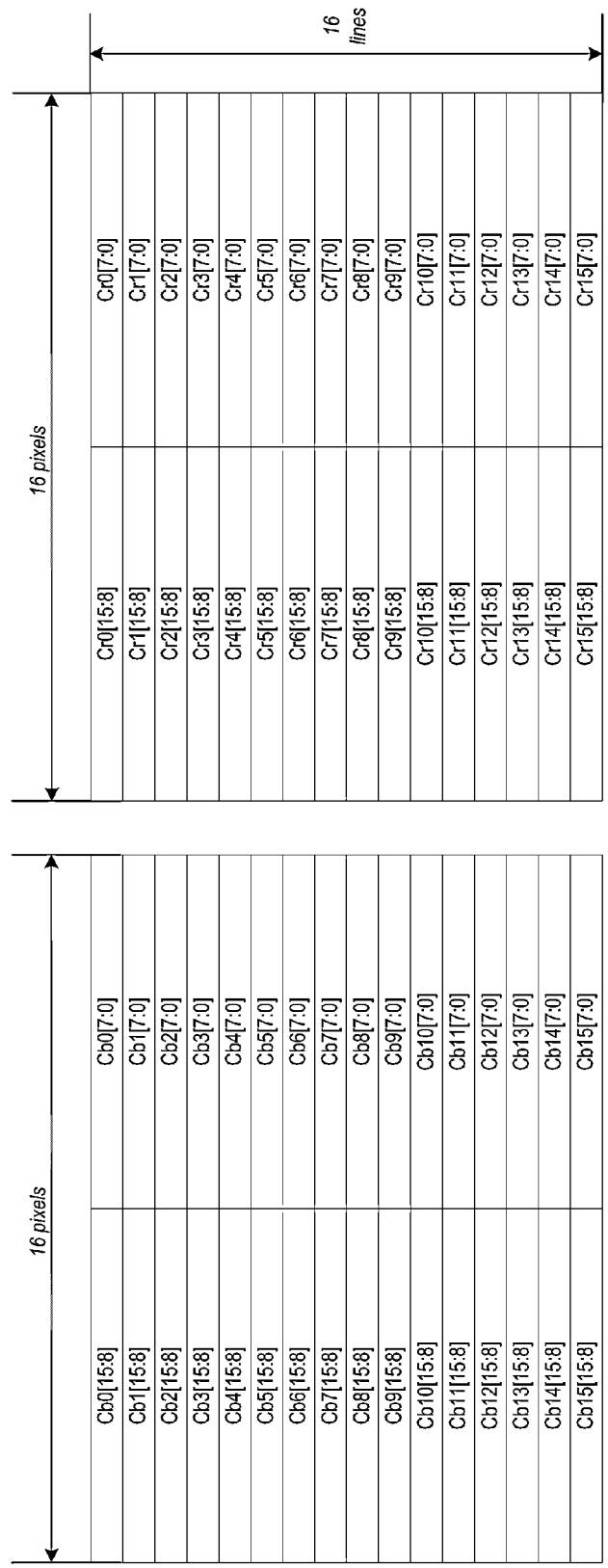
FIGS. 17 through 19 graphically illustrate pixel formats for chroma 4:4:4, 4:2:2, and 4:2:0, respectively.
Figure 18:
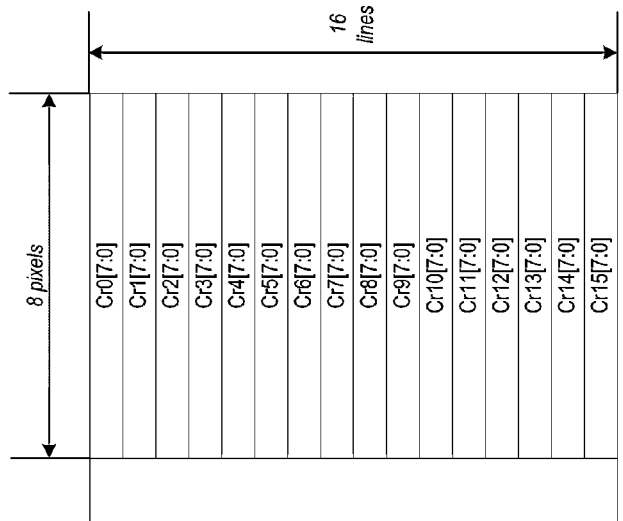
Figure 18:
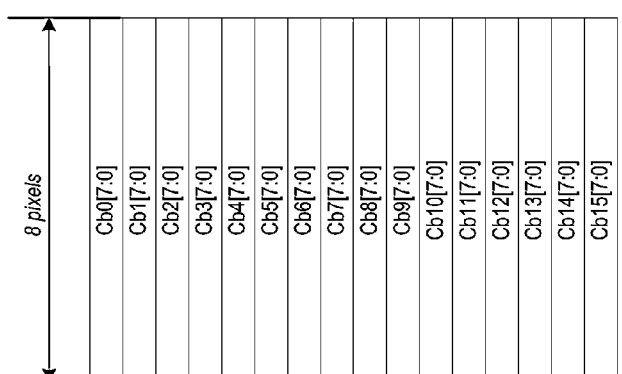
Figure 19:
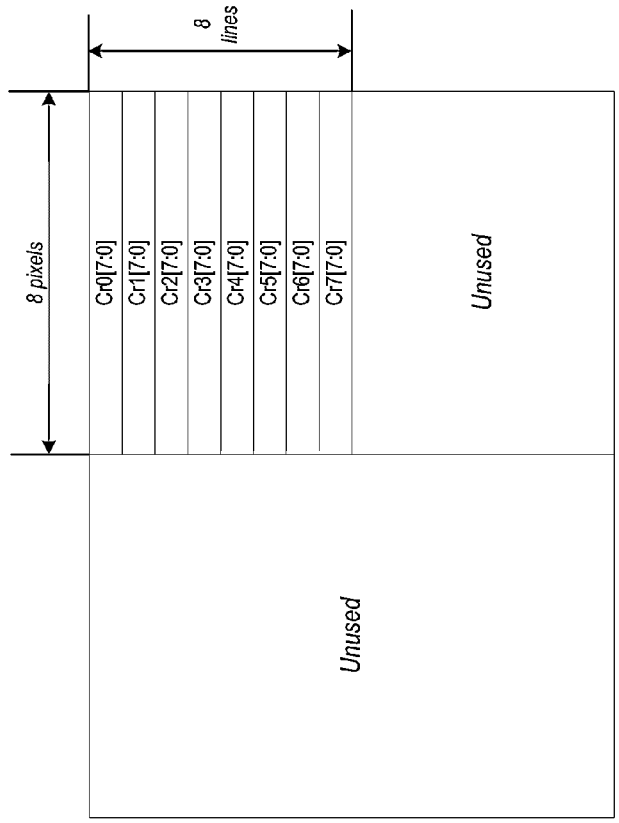
Figure 19:
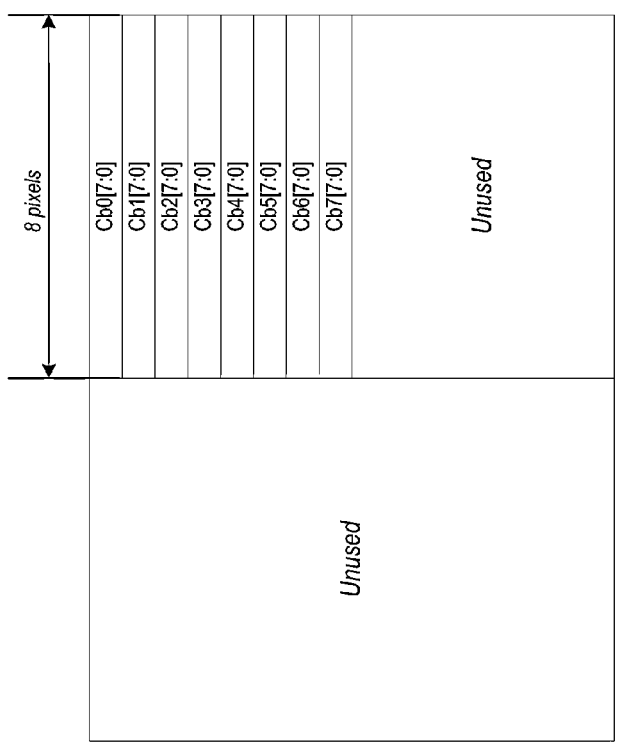

FIGS. 17 through 19 graphically illustrate pixel formats for chroma 4:4:4, 4:2:2, and 4:2:0, respectively. A full size chroma block is 8×8, 8×16, or 16×16 pixels for chroma formats 4:2:0, 4:2:2 and 4:4:4, respectively. However, each chroma pixel has a Cb (blue-difference) and a Cr (red-difference) chroma component. Thus, in chroma format, each pixel is represented by two bytes (Cb and Cr). FIG. 17 shows chroma 4:4:4 format. For chroma 4:4:4, there are two 256-byte blocks, with one block including the 16×16 Cb components and the other block including the 16×16 Cr components. FIG. 18 shows chroma 4:2:2 format. In chroma 4:2:2, one 256-byte block includes the 8×16 Cb components, and the other block includes the 8×16 Cr components. The remainder of the blocks is unused. FIG. 19 shows chroma 4:2:0 format, in which one 256-byte block includes the 8×8 Cb components, and the other block includes the 8×8 Cr components. The remainder of the blocks is unused.

Figure 22:
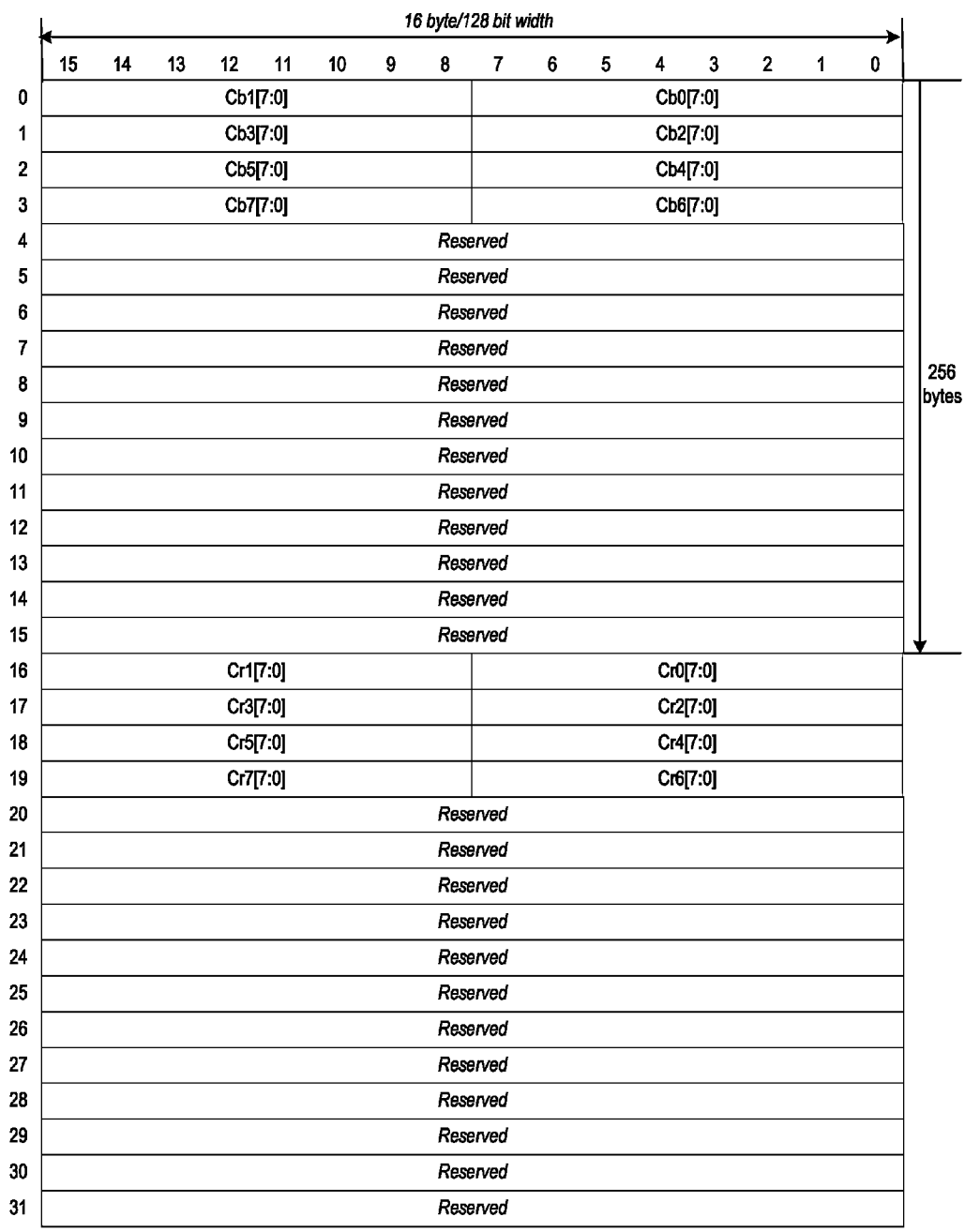

FIGS. 20 through 22 graphically illustrate chroma data formats that may be used in the stage buffer memory, according to at least some embodiments. In at least some embodiments, a 512-byte buffer may be used for chroma formats 4:2:0, 4:2:2 and 4:4:4. The chroma data is organized in the buffer memory in scan order. Cb data is first in the buffer, followed by the Cr data. For each chroma format, the start offset of Cr data in the buffer is 256 bytes after the start of the Cb data. As shown in FIG. 20, chroma 4:4:4 fills the entire buffer. As shown in FIG. 21, Cb data fills the first eight (0-7) 128-bit lines of the buffer, while Cr data fills lines 16-23. The rest of the lines are unused. As shown in FIG. 22, Cb data fills the first four (0-3) 128-bit lines, while Cr data fills lines 16-19. The rest of the lines are unused.

Figure 23:
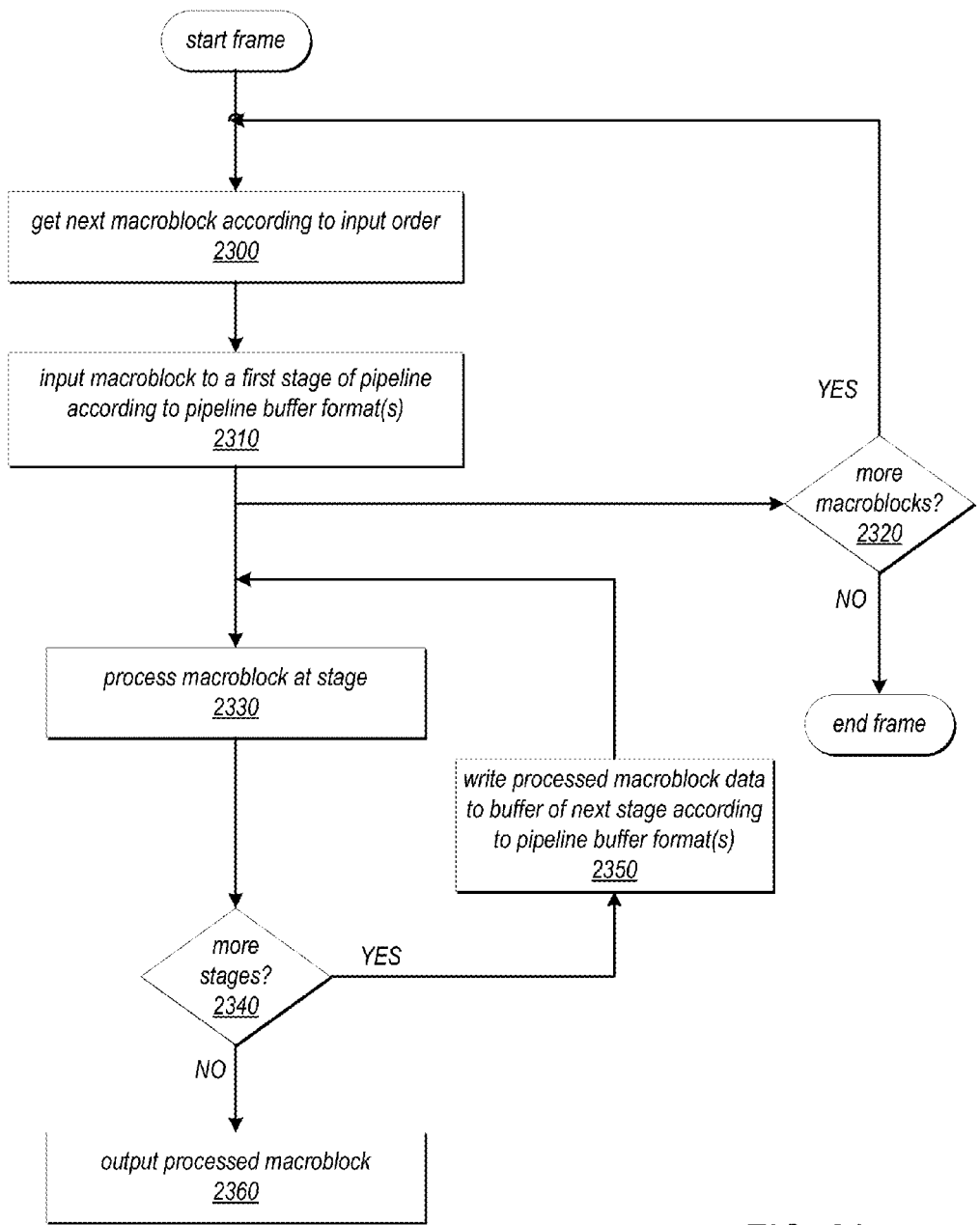
FIG. 23 is a flowchart of a method for passing macroblock data through the stages of a block processing pipeline using pipeline buffer formats, according to at least some embodiments.

FIG. 23 is a flowchart of a method for passing macroblock data through the stages of a block processing pipeline using pipeline buffer formats, according to at least some embodiments. As indicated at 2300, a next macroblock may be input to the pipeline for processing. In at least some embodiments, macroblocks may be input to the pipeline according to a knight's order processing method as described in the section titled Knight's order processing. As indicated at 2310, the macroblock may be input to a first stage of the pipeline according to one or more pipeline buffer formats. For example, luma data for the macroblock may be written to a buffer of the first stage according to the luma data format illustrated in FIG. 16, and chroma data for the macroblock may be written to the buffer of the first stage according to one or more of the chroma data formats illustrated in FIGS. 20 through 22. As shown by element 2320, macroblocks may be input to the pipeline from a frame as long as there are macroblocks remaining in the frame to be processed.

As indicated at 2330, the macroblock data may be processed at the stage. In at least some embodiments of a pipeline, a given stage of the pipeline may operate on luma data, on chroma data, or on both luma and chroma data. Also note that processing a macroblock at a stage may, but does not necessarily, involve processing the macroblock data according to reference data fetched from a reference frame. At 2340, if there are more stages, then the processed macroblock data may be passed to a next stage of the pipeline for additional processing. For example, luma data for the macroblock may be written to a buffer of the next stage according to the luma data format illustrated in FIG. 16, and chroma data for the macroblock may be written to the buffer of the next stage according to one or more of the chroma data formats illustrated in FIGS. 20 through 22. At 2340, if there are no more stages, then processing of the macroblock is done and the processed macroblock may be output as indicated at 2360. Outputting the macroblock may involve both outputting the block as part of an output video stream and also writing reference data from the processed macroblock to a memory for use in processing subsequent frames.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 24:
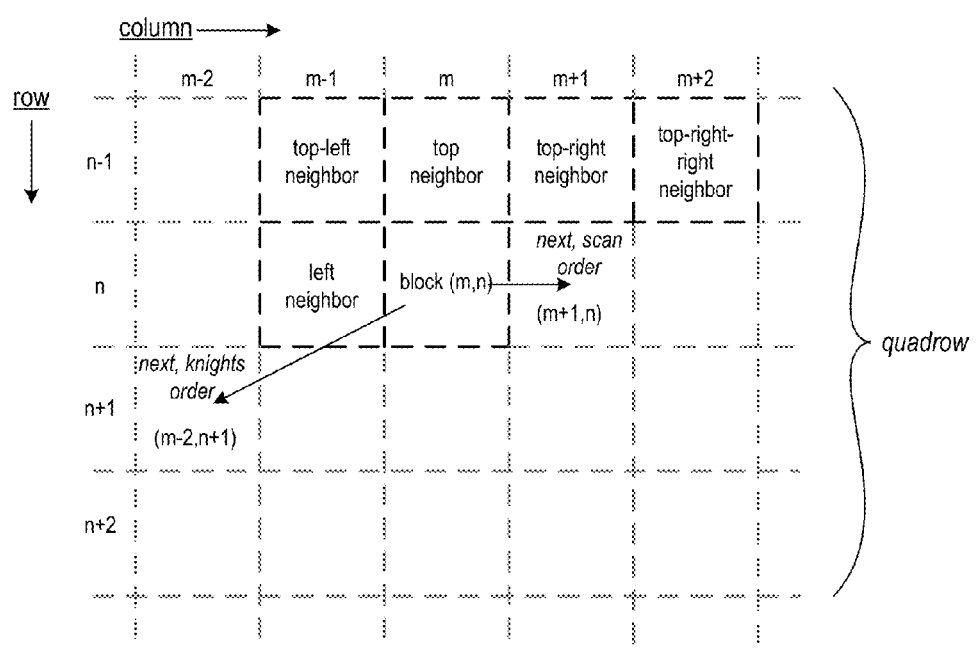
FIG. 24 shows neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 24 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 24, information from the left neighbor of block (m,n) may be required to perform a particular operation on the block. In the knight's order processing method, rather than inputting block (m+1, n) into the pipeline immediately after block (m,n), the next block input to the pipeline is block (m−2, n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 24, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 24. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
  The next block is two columns left, one row down (−2,+1).
Otherwise, at the bottom row of a quadrow:
  The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quad-row (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 25A and 25B graphically illustrate the knight's order processing method, according to at least some embodiments. For simplicity, these Figures use an example 192× 192 pixel frame divided into 144 16×16 pixel blocks, with 12 rows and 12 columns of blocks. However, it is to be noted that the knight's order processing method can be applied to input video frames of any dimensions. In FIG. 25A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 25A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 25A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 25B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 25A, input to the pipeline may begin with the first invalid block to the left of the first block in top row of the first quadrow.

Figure 26A:
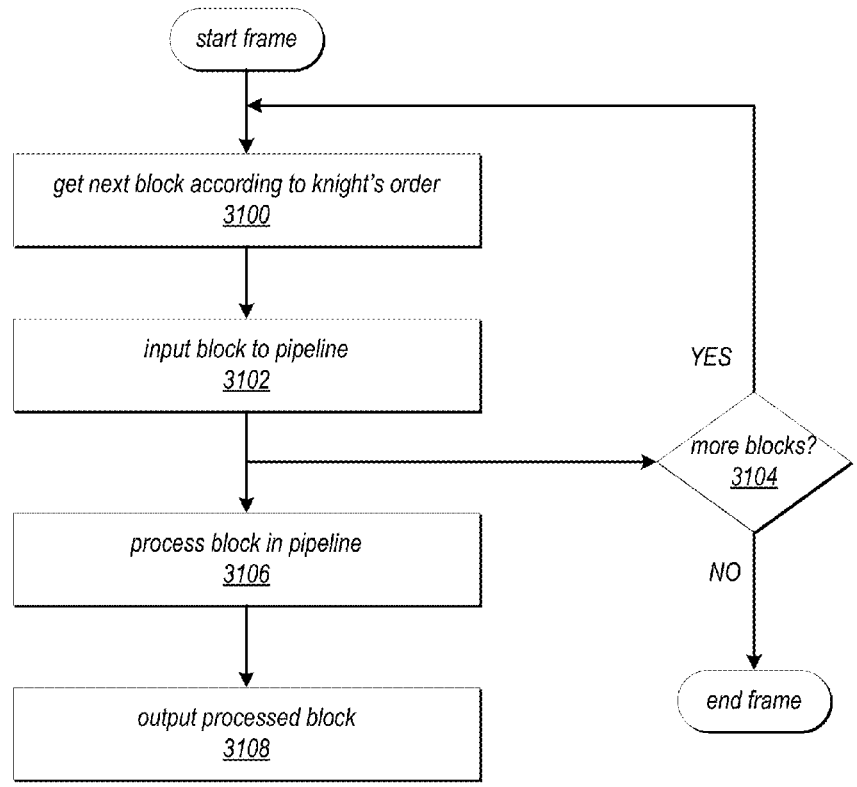
FIGS. 26A and 26B are high-level flowcharts of a knight's order processing method for a block processing pipeline, according to at least some embodiments.
Figure 26B:
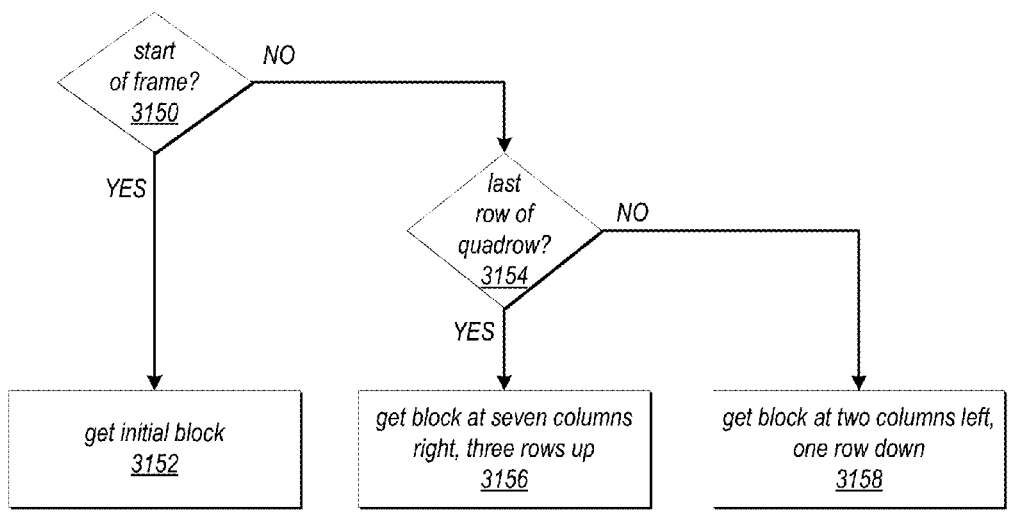

FIGS. 26A and 26B are high-level flowcharts of a knight's order processing method for a block processing pipeline, according to at least some embodiments. In FIG. 26A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 26B is a flowchart of an example algorithm for determining a next input block that that may be implemented by the knight's order processing method, and expands on element 3100 of FIG. 26A. FIG. 26B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 24. The knight's order processing method with quadrow constraints provides locality of neighbor information that may be leveraged to provide local caching of neighbor data at each stage of the pipeline in relatively small local buffers. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 27:
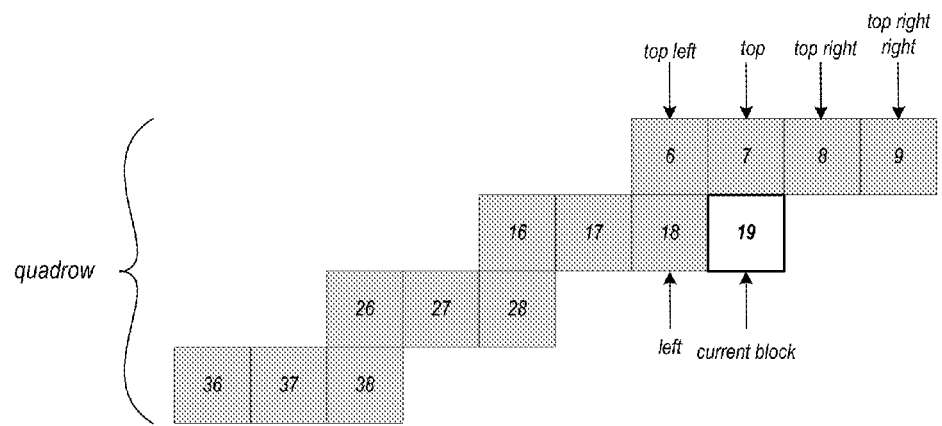
FIG. 27 shows a portion of a quadrow as processed in a pipeline according to the knight's order processing method that may be cached in the current quadrow buffer, according to at least some embodiments FIG. 28 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 27 shows a portion of a quadrow as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 28:
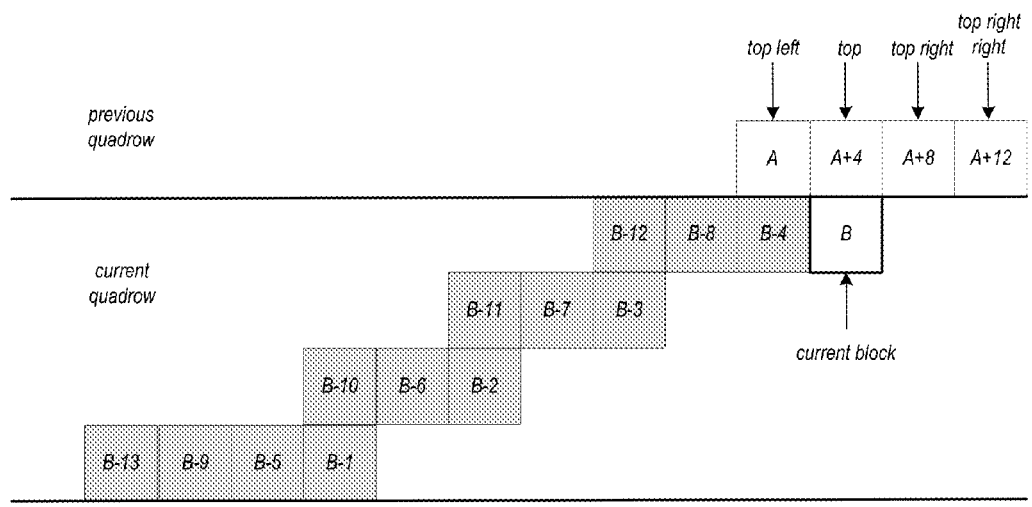

FIG. 28 graphically illustrates blocks in a current quadrow being processed according to the knight's order processing method, as well as neighbor blocks in the last row of the previous quadrow, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 29:
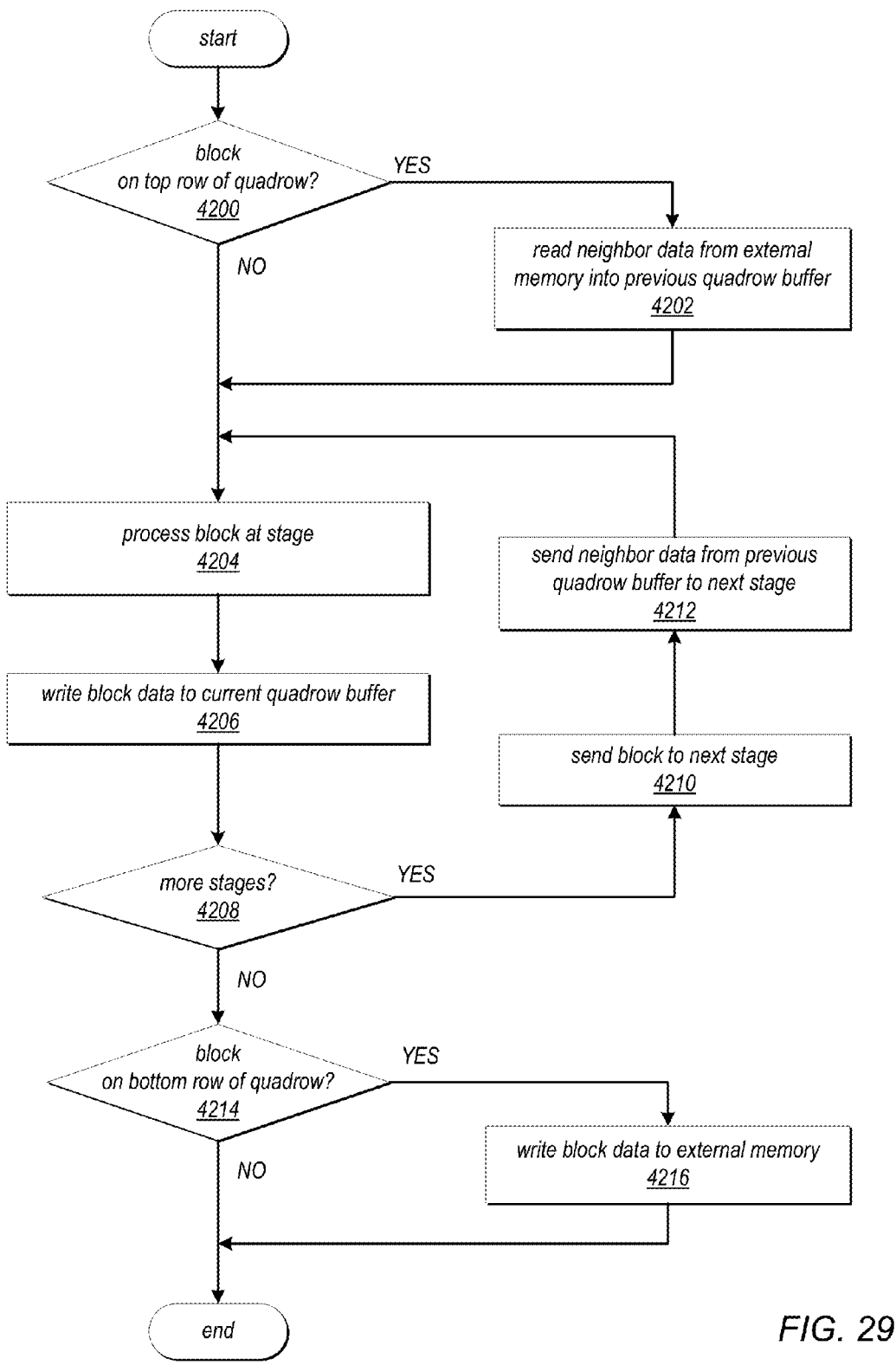
FIG. 29 is a flowchart of a method for processing blocks in a block processing pipeline in which neighbor data is cached in local buffers at the stages of the pipeline, according to at least some embodiments.

FIG. 29 is a flowchart of a method for processing blocks in a block processing pipeline in which neighbor data is cached in local buffers at the stages of the pipeline, according to at least some embodiments. For example, the method of FIG. 29 may be used at element 3106 of FIG. 26A to process blocks input to the pipeline according to the knight's order processing method as shown at elements 3100, 3102, and 3104 of FIG. 26A. In FIG. 29, a block is input to the pipeline. At 4200, at a first stage of the pipeline, if the block is on the top row of a quadrow, then neighbor data for the block may be read from external memory (for example, via DMA) into a previous quadrow buffer as indicated at 4202. In at least some embodiments, the neighbor data corresponds to the top-right-right neighbor of the current block on the bottom row of the previous quadrow. As indicated at 4204, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 4206, information about the current block may be written to the current quadrow buffer at the stage for use on subsequent blocks. The information may overwrite an oldest entry in the current quadrow buffer.

At 4208, if there are more stages, then the block may be sent to a next stage, as indicated at 4210. At 4212, neighbor information from the previous quadrow buffer may also be sent to the next stage. In at least some embodiments, this neighbor information is only sent to the next stage if the current block is on the top row of a quadrow. Elements 4204 through 4212 may be repeated until the block reaches and is processed by a last stage of the pipeline. At 4208, if there are no more stages, then processing of the block in the pipeline is done. At 4214, if the block is on the bottom row of a quadrow, then information for the block is written to an external memory (for example, via DMA) to be read as neighbor data for blocks in the top row of a next quadrow. In addition, all of the processed valid blocks are output as shown by element 3108 of FIG. 26A.

Example Pipeline Units

Figure 30A:
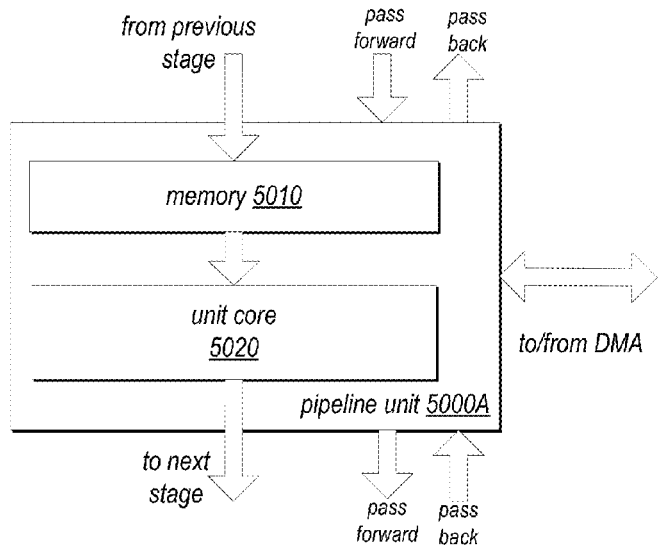
FIGS. 30A and 30B are block diagrams of example pipeline processing units that may be used at the stages of a block processing pipeline that implements one or more of the block processing methods and apparatus as described herein, according to at least some embodiments.
Figure 30B:
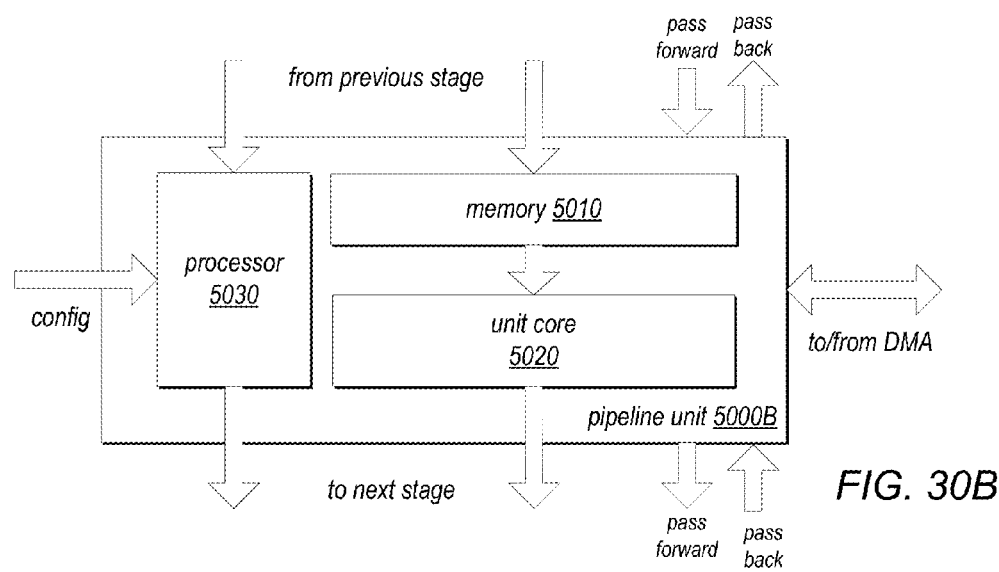
Figure 30C:
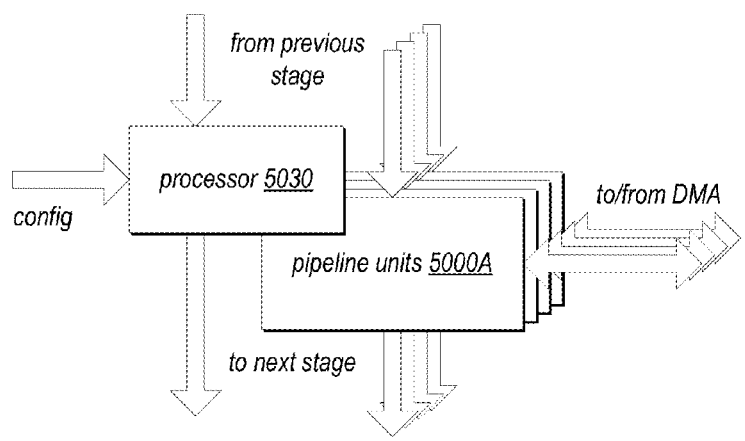
FIG. 30C shows that a single processor may be associated with a group of two or more pipeline units.

FIGS. 30A through 30C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 30A and 30B may be used at each stage of the example block processing pipeline shown in FIG. 31. Note that FIGS. 30A through 30C are not intended to be limiting; a pipeline processing unit may include more or fewer components and features than those shown in the Figures.

As shown in FIG. 30A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 30B, a pipeline unit 5000B, in addition to a memory 5010 and unit core 5020 as shown in FIG. 30A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 30A and 30B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 30C, two or more units 5000A as shown in FIG. 30A may be grouped together and configured to perform an operation in the pipeline. A single processor 5030 may be used to control and/or configure the pipeline units 5000A.

Example Block Processing Pipeline

FIG. 31 is a high-level block diagram of general operations in an example block processing method 6000 for H.264 encoding that may be implemented in stages by a block processing pipeline that may implement one or more of the block processing methods and apparatus as described herein, according to at least some embodiments. A block processing pipeline that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920× 1080 pixels, 2.1 megapixels) encoded in YCbCr color space. However, other input video formats may be encoded into H.264 using embodiments of the pipeline in a video encoder apparatus.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 31, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 30. An example SOC that includes a video encoder apparatus is illustrated in FIG. 31. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 31 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 31 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 30A through 30C. Also note that each general operation shown in FIG. 31 may be subdivided into two or more operations that may be implemented by pipeline units at one, two, or more stages of the pipeline. However, two or more of the operations shown in FIG. 31 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 31 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1410 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed, based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 6050. The transcoder may be implemented as a functional component of the pipeline or as a functional component that is external to the pipeline. In at least some embodiments, the transcoder 6050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 6050 handles stitching the start and end of each row to generate a continuous stream at macroblock row boundaries. In at least some embodiments, the pipeline may embed metadata in the CAVLC output stream to facilitate stitching of the rows by the transcoder 6050.

Example Video Encoder Apparatus

FIG. 32 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 32, or fewer functional components than those shown in FIG. 32. An example block processing method that may be implemented by pipeline 7040 component is shown in FIG. 31. An example a system-on-a-chip (SOC) that may include at least one video encoder apparatus 7000 is illustrated in FIG. 33.

Example System on a Chip (SOC)

Figure 33:
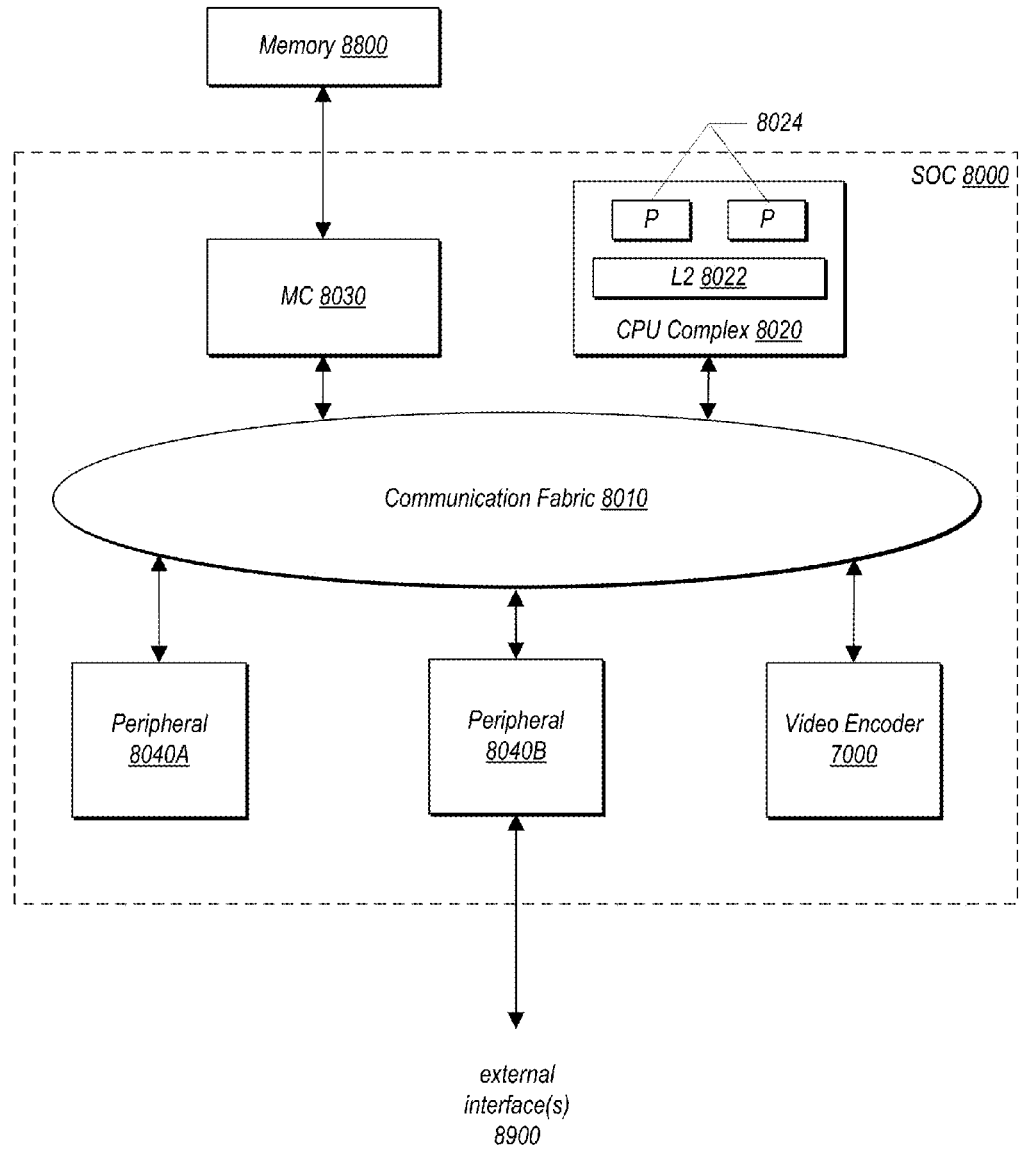
FIG. 33 is a block diagram of one embodiment of a system on a chip (SOC).

Turning now to FIG. 33, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 32. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 33, SOC 8000 may include at least one instance of a video encoder 7000 component, for example a video encoder 7000 as illustrated in FIG. 32 that includes a block processing pipeline 7040 component that implements a block processing method 6000 as illustrated in FIG. 31. Video encoder 7000 may be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 31.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 33, such as within the CPU complex 8020) may vary from embodiment to embodiment. There may be more or fewer of each component/subcomponent than the number shown in FIG. 33.

Example System

Figure 34:
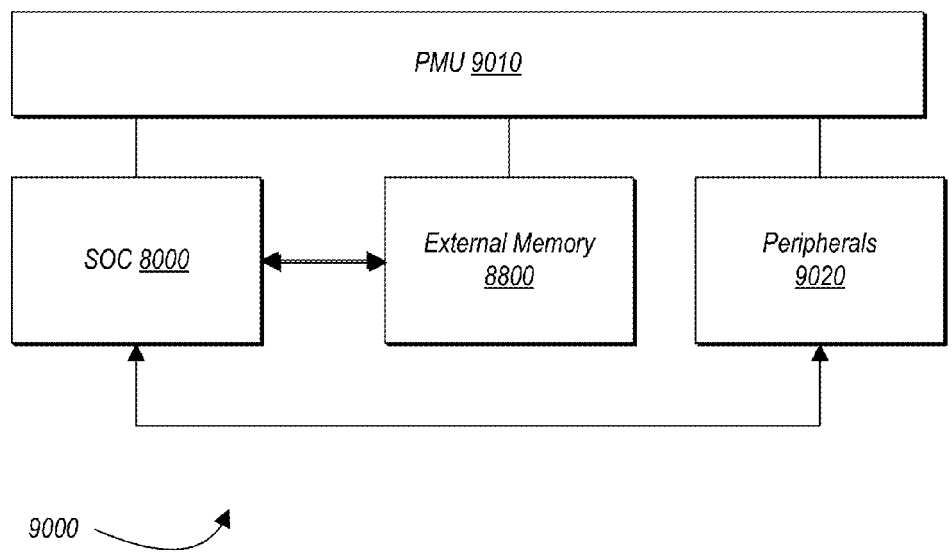
FIG. 34 is a block diagram of one embodiment of a system.

FIG. 34 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   a block processing pipeline comprising a plurality of stages each configured to perform one or more operations on blocks of pixels from a current frame passing through the pipeline;
   wherein the block processing pipeline is configured to store data from processed blocks of the current frame as reference data to a memory according to a tile format, wherein the tile format stores reference data from each processed block of the frame in a corresponding tile, wherein each tile includes two or more contiguous memory blocks in the memory, each memory block of a block request size of the memory, and wherein the tiles are stored to a reference frame corresponding to the current frame passing through the pipeline in the memory in sequential order of the blocks of pixels in the frame; and wherein the block processing pipeline is further configured to fetch one or more windows of reference data from a reference frame corresponding to another frame, wherein the reference frame was previously stored to the memory according to the tile format, and process at least one block of pixels from the current frame according to the fetched one or more windows of reference data from the reference frame corresponding to the other frame;

wherein at least one of the one or more windows overlaps at least a portion of at least two of the tiles in the reference frame, and wherein, to fetch the overlapping window of reference data from the reference frame according to the tile format, the block processing pipeline is configured to, for each overlapped tile:
determine a start address for a portion of the window in the overlapped tile; and
fetch the portion of the window in the overlapped tile beginning at a memory block that includes the start address.

2. The apparatus as recited in claim 1, wherein the block request size is 64 bytes.

3. The apparatus as recited in claim 1, wherein the blocks of pixels are 16×16 byte macroblocks.

4. The apparatus as recited in claim 1, wherein, to fetch a window of reference data from a reference frame according to the tile format, the block processing pipeline is configured to issue one or more block requests to the memory each specifying a particular memory block of the reference frame to be fetched.

5. The apparatus as recited in claim 1, wherein the reference data includes luma reference data from the processed blocks of the current frame, and wherein each tile includes four 64-byte memory blocks of luma samples from a corresponding processed block of pixels.

6. The apparatus as recited in claim 1, wherein the reference data includes chroma reference data from the processed blocks of the current frame, and wherein each tile includes two or more 64-byte memory blocks of chroma samples from a corresponding processed block of pixels.

7. The apparatus as recited in claim 6, wherein chroma format is one of chroma 4:4:4, 4:2:2, or 4:2:0 formats, wherein each tile includes eight 64-byte memory blocks of chroma samples for chroma 4:4:4 format, four 64-byte memory blocks of chroma samples for chroma 4:2:2 format, or two 64-byte memory blocks of chroma samples for chroma 4:2:0 format.

8. The apparatus as recited in claim 1, wherein, to store data from processed blocks of the current frame as reference data to a memory according to a tile format, a last stage of the block processing pipeline is configured to store reference data from one or more previously processed blocks of pixels to the memory subsequent to processing a current block of pixels at the stage, wherein processing the current block of pixels affects pixels in the one or more previously processed blocks of pixels.

9. A method, comprising:
inputting blocks of pixels from an input frame to a block processing pipeline comprising a plurality of stages, each stage configured to perform one or more operations on each block of pixels;
storing, by the block processing pipeline, data from processed blocks of the input frame as reference data to a memory according to a tile format, wherein the tile format stores reference data from each processed block of the frame in a corresponding tile, wherein each tile includes two or more contiguous memory blocks in the memory, each memory block of a block request size of the memory, and wherein the tiles are stored to a reference frame corresponding to the current frame passing through the pipeline in the memory in sequential order of the blocks of pixels in the input frame;
fetching, by the block processing pipeline, one or more windows of reference data from one or more reference frames corresponding to one or more other frames, wherein the reference frames were previously stored to the memory according to the tile format; and
processing, by the block processing pipeline, at least one block of pixels from the input frame according to the fetched one or more windows of reference data from the one or more other reference frames;
wherein at least one of the one or more windows overlaps at least a portion of at least two of the tiles in a respective reference frame, and wherein fetching the overlapping window of reference data from the respective reference frame according to the tile format comprises, for each overlapped tile:
determining a start address for a portion of the window in the overlapped tile; and
fetching the portion of the window in the overlapped tile beginning at a memory block that includes the start address.

10. The method as recited in claim 9, wherein the block request size is 64 bytes, and wherein the blocks of pixels are 16×16 byte macroblocks.

11. The method as recited in claim 9, wherein fetching a window of reference data from a reference frame according to the tile format comprises issuing one or more block requests to the memory each specifying a particular memory block of the reference frame to be fetched.

12. The method as recited in claim 9, wherein the reference data includes luma reference data stored to a luma reference frame and chroma reference data stored to a chroma reference frame, wherein each luma tile includes four 64-byte memory blocks of luma samples from a corresponding processed block of pixels, and wherein each chroma tile includes two or more 64-byte memory blocks of chroma samples from a corresponding processed block of pixels.

13. The method as recited in claim 12, wherein chroma format is one of chroma 4:4:4, 4:2:2, or 4:2:0 formats, wherein each chroma tile includes eight 64-byte memory blocks of chroma samples for chroma 4:4:4 format, four 64-byte memory blocks of chroma samples for chroma 4:2:2 format, or two 64-byte memory blocks of chroma samples for chroma 4:2:0 format.

14. The method as recited in claim 9, wherein storing data from processed blocks of the input frame as reference data to a memory according to a tile format comprises storing, by a last stage of the block processing pipeline, reference data from one or more previously processed blocks of pixels to the memory subsequent to processing a current block of pixels at the stage, wherein processing the current block of pixels affects pixels in the one or more previously processed blocks of pixels.

15. A device, comprising:
a memory; and
an apparatus configured to process video frames and to store the processed video frames as frame data to the memory, the apparatus comprising a block processing pipeline that implements a plurality of stages each configured to perform one or more operations on a block of pixels from a frame passing through the pipeline;

wherein at least one stage of the block processing pipeline is configured to store data from processed blocks of the current frame as reference data to the memory according to a tile format, wherein the tile format stores reference data from each processed block of the frame in a corresponding tile, wherein each tile includes two or more contiguous memory blocks in the memory, each memory block of a block request size of the memory, and wherein the tiles are stored to a reference frame corresponding to the current frame passing through the pipeline in the memory in sequential order of the blocks of pixels in the frame;

wherein one or more stages of the block processing pipeline are configured to fetch windows of reference data from reference frames corresponding to other frames, wherein the reference frames were previously stored to the memory according to the tile format, and process blocks of pixels from the current frame according to the fetched windows of reference data from the other frames;

wherein at least one of the one or more windows overlaps at least a portion of at least two of the tiles in a respective reference frame, and wherein, to fetch the overlapping window of reference data from the respective reference frame according to the tile format, the one or more stages of the block processing pipeline are configured to, for each overlapped tile:

determine a start address for a portion of the window in the overlapped tile; and fetch the portion of the window in the overlapped tile beginning at a memory block that includes the start address.

16. The device as recited in claim 15, wherein the block request size is 64 bytes, and wherein the blocks of pixels are 16×16 byte macroblocks.

17. The device as recited in claim 15, wherein, to fetch a window of reference data from a reference frame according to the tile format, the one or more stages are configured to issue one or more block requests to the memory each specifying a particular memory block of the reference frame to be fetched.

18. The device as recited in claim 17, wherein the reference data includes luma reference data stored to a luma reference frame and chroma reference data stored to a chroma reference frame, wherein each luma tile includes four 64-byte memory blocks of luma samples from a corresponding processed block of pixels, and wherein each chroma tile includes two or more 64-byte memory blocks of chroma samples from a corresponding processed block of pixels.

19. The device as recited in claim 15, wherein chroma format is one of chroma 4:4:4, 4:2:2, or 4:2:0 formats, wherein a chroma tile includes eight 64-byte memory blocks of chroma samples for chroma 4:4:4 format, four 64-byte memory blocks of chroma samples for chroma 4:2:2 format, or two 64-byte memory blocks of chroma samples for chroma 4:2:0 format.

20. The device as recited in claim 15, wherein, to store data from processed blocks of the current frame as reference data to a memory according to a tile format, the at least one stage of the block processing pipeline is configured to store reference data from one or more previously processed blocks of pixels to the memory subsequent to processing a current block of pixels at the at least one stage, wherein processing the current block of pixels affects pixels in the one or more previously processed blocks of pixels.

* * * * *